United States Patent
Yano et al.

(10) Patent No.: US 8,130,406 B2
(45) Date of Patent: Mar. 6, 2012

(54) RECORDING APPARATUS IMAGE SUPPLY DEVICE AND RECORDING SYSTEM AND CONTROL METHOD AND PROGRAM FOR IMAGE LAYOUT DETERMINATION

(75) Inventors: Kentaro Yano, Yokohama (JP); Takao Aichi, Tokyo (JP); Akitoshi Yamada, Yokohama (JP); Fumihiro Goto, Kawasaki (JP); Kazuyuki Masumoto, Yokohama (JP); Ruriko Mikami, Kawasaki (JP); Hiromitsu Hirabayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 862 days.

(21) Appl. No.: 10/567,160

(22) PCT Filed: Aug. 6, 2004

(86) PCT No.: PCT/JP2004/011644
§ 371 (c)(1),
(2), (4) Date: Nov. 10, 2008

(87) PCT Pub. No.: WO2005/014294
PCT Pub. Date: Feb. 17, 2005

(65) Prior Publication Data
US 2009/0059269 A1    Mar. 5, 2009

(30) Foreign Application Priority Data

Aug. 8, 2003  (JP) ................................. 2003-290600
Mar. 26, 2004 (JP) ................................. 2004-093159

(51) Int. Cl.
*G06K 15/00* (2006.01)

(52) U.S. Cl. .................... 358/1.18; 358/1.15; 348/207.2

(58) Field of Classification Search .................. 358/1.14, 358/1.15, 1.18, 1.13, 1.9; 386/46; 347/19; 348/231.6, 222.1, 239, 231.3, 333.12, 207.2; 710/13; 382/305
See application file for complete search history.

(56) References Cited

U.S. PATENT DOCUMENTS 6,948,792 B2 *  9/2005 Narusawa et al. .............. 347/19
(Continued)

FOREIGN PATENT DOCUMENTS

EP           1 498 811 A1     1/2005
(Continued)

OTHER PUBLICATIONS

Supplemental International Search Report from European Patent Application No. 0477169.6, Jun. 10, 2010, European Patent Office.

*Primary Examiner* — Twyler Haskins
*Assistant Examiner* — Nicholas Pachol
(74) *Attorney, Agent, or Firm* — Fitzpatrick, Cella, Harper & Scinto

(57) ABSTRACT

When a print command that designates a layout recording function by its upper layer, and designates a frame print function by its lower layer is transmitted from a camera to a printer, the printer determines a layout print function that prints a plurality of images on a single sheet, based on the upper layer. In a case where the printer can determine the lower layer of the command, the printer acquires details of a layout. In a case where the printer cannot determine the lower layer of the command, the printer determines a normal frame print function. The printer prints a normal layout image or special frame image in accordance with the determined layout of images.

6 Claims, 21 Drawing Sheets

U.S. PATENT DOCUMENTS

| | | | |
|---|---|---|---|
| 7,085,435 B2 | 8/2006 | Takiguchi et al. | 382/294 |
| 7,098,914 B1 | 8/2006 | Katayama et al. | 345/427 |
| 7,161,701 B2 | 1/2007 | Ogiwara et al. | 358/1.15 |
| 7,167,603 B2 * | 1/2007 | Fukuda | 382/305 |
| 7,170,627 B2 | 1/2007 | Tanaka et al. | 358/1.15 |
| 7,207,735 B2 * | 4/2007 | Narusawa et al. | 358/1.15 |
| 7,594,041 B2 * | 9/2009 | Aono et al. | 710/13 |
| 2001/0022667 A1 * | 9/2001 | Yoda | 358/1.14 |
| 2001/0030692 A1 | 10/2001 | Yoneda | 348/207 |
| 2001/0048802 A1 * | 12/2001 | Nakajima et al. | 386/46 |
| 2002/0001036 A1 * | 1/2002 | Kinjo | 348/231 |
| 2002/0040375 A1 * | 4/2002 | Simon et al. | 707/517 |
| 2002/0186383 A1 * | 12/2002 | Obrador | 358/1.9 |
| 2003/0085942 A1 * | 5/2003 | Narusawa et al. | 347/19 |
| 2003/0093759 A1 | 5/2003 | Narusawa | 715/517 |
| 2004/0012821 A1 * | 1/2004 | Nakajima | 358/1.15 |
| 2004/0028294 A1 * | 2/2004 | Fukuda | 382/305 |
| 2004/0212697 A1 * | 10/2004 | Kawaoka et al. | 348/231.6 |
| 2004/0252340 A1 * | 12/2004 | Komagamine et al. | 358/1.18 |
| 2005/0110877 A1 * | 5/2005 | Shirakawa et al. | 348/222.1 |
| 2005/0122412 A1 * | 6/2005 | Shirakawa et al. | 348/239 |
| 2005/0141941 A1 * | 6/2005 | Narusawa et al. | 400/76 |
| 2005/0152002 A1 * | 7/2005 | Shirakawa et al. | 358/1.18 |
| 2005/0157186 A1 * | 7/2005 | Tsuji et al. | 348/231.3 |
| 2005/0212945 A1 * | 9/2005 | Shirakawa et al. | 348/333.12 |
| 2005/0231749 A1 * | 10/2005 | Narusawa et al. | 358/1.13 |
| 2006/0188175 A1 | 8/2006 | Takiguchi et al. | 382/284 |
| 2006/0238536 A1 | 10/2006 | Katayama et al. | 345/427 |
| 2009/0009813 A1 * | 1/2009 | Nakajima | 358/302 |
| 2009/0091628 A1 * | 4/2009 | Narusawa et al. | 348/207.2 |

FOREIGN PATENT DOCUMENTS

| | | |
|---|---|---|
| JP | 6-19649 | 1/1994 |
| JP | 8-286854 | 11/1996 |
| JP | 11-146187 | 5/1999 |
| JP | 2000-259659 | 9/2000 |
| JP | 2001-147790 | 5/2001 |
| JP | 2001-298694 | 10/2001 |
| JP | 2001-333363 | 11/2001 |
| JP | 2002-211049 | 7/2002 |
| JP | 2002-254758 | 9/2002 |
| JP | 2003-025678 | 1/2003 |
| JP | 2003-61034 | 2/2003 |
| JP | 2003-114780 | 4/2003 |
| JP | 2003-143520 | 5/2003 |
| JP | 2003-143539 | 5/2003 |
| JP | 2003-175657 | 6/2003 |
| WO | 03/085510 A1 | 10/2003 |
| WO | WO 03/085510 | 10/2003 |

* cited by examiner

F I G. 7

```
<startJob>
  <jobConfig>
      <quality>50000000</quality>          —— 700
      <paperSize>51060000</paperSize>      —— 701
      <paperType>52020000</paperType>      —— 702
      <fileType>53000000</fileType>        —— 703
720 — <datePrint>54010000</datePrint>      —— 704
      <fileNamePrint>55000000</fileNamePrint> —— 705
      <imageOptimize>56000000</imageOptimize> —— 706
      <fixedSize>58030000</fixedSize>      —— 707
      <cropping>59000000</cropping>        —— 708
  </jobConfig>
  <printInfo>
      <fileID>00000001</fileID>            —— 709
721 — <date>2002/10/28</date>              —— 710
  </printInfo>
</startJob>
```

F I G. 8A

| prtPID | ImagePath | copyID | progress | image Printed |
|---|---|---|---|---|

F I G. 8B

| dpsPrint ServiceStatus | jobEnd Reason | error Status | error Reason | disconnect Enable | Capability Changed | newJobOK |
|---|---|---|---|---|---|---|

FIG. 9A

```
<input>
  <getCapability>
    <Capability>
      <layouts/> ~ 901
    </Capability>
  </getCapability>
</input>
```

FIG. 9B

```
<output>
  <result>10000000</result>
  <getCapability>
    <Capability> ~ 902
      <layouts/> ~ 903
       57000000  57010000  57020000 ~ 904
      </layouts> ~ 905
    </Capability> ~ 906
  </getCapability>
</output>
```

X X X X : MAJOR CODE

Y Y Y Y : MINOR CODE

Y Y Y Y   MEANING OF YYYY IS DETERMINED BY VALUE AS FOLLOWS :

0000 : DEFAULT 0001-7FFF : VENDOR COMMON CODE

8000-FFFF : VENDOR UNIQUE CODE

FIG. 11A

```
<input>
  <getFileInfo>
    <fileID>00000001</fileID>
  </getFileInfo>
</input>
```

FIG. 11B

```
<output>
  <result>10000000</result>
  <getFileInfo>
    <fileType>53010000</fileType>
    <fileSize>000F4240</fileSize>
  </getFileInfo>
</output>
```

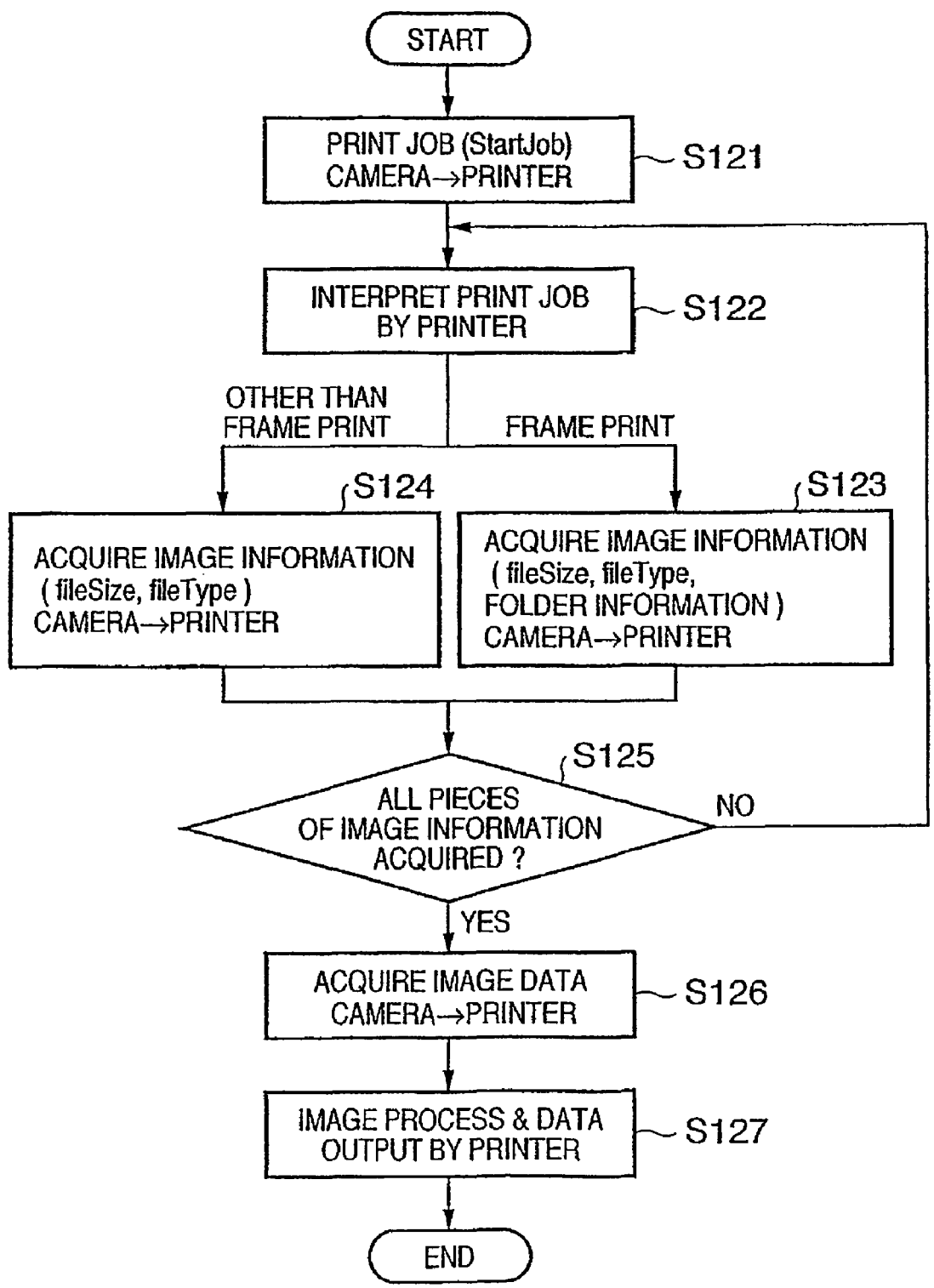

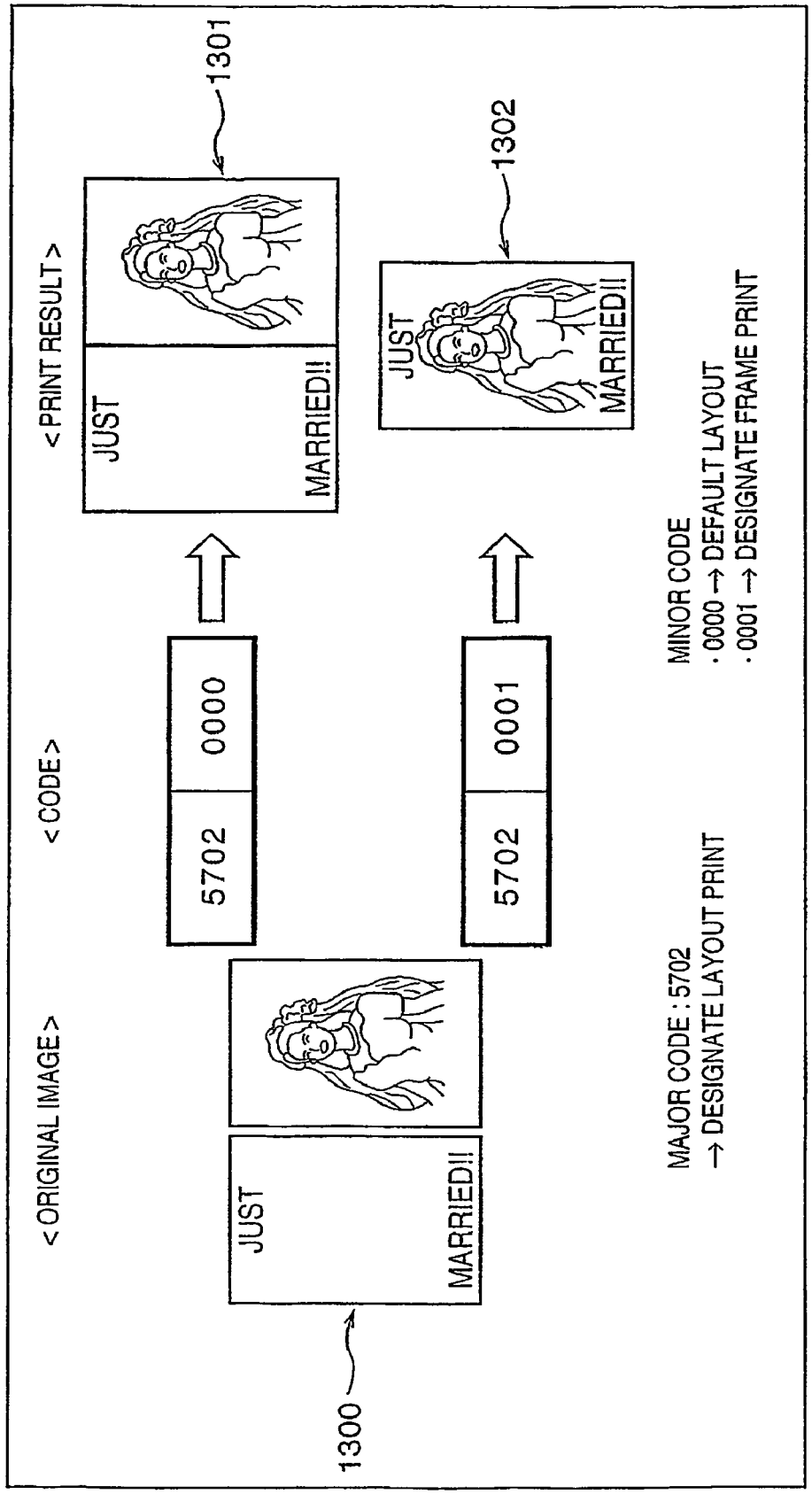

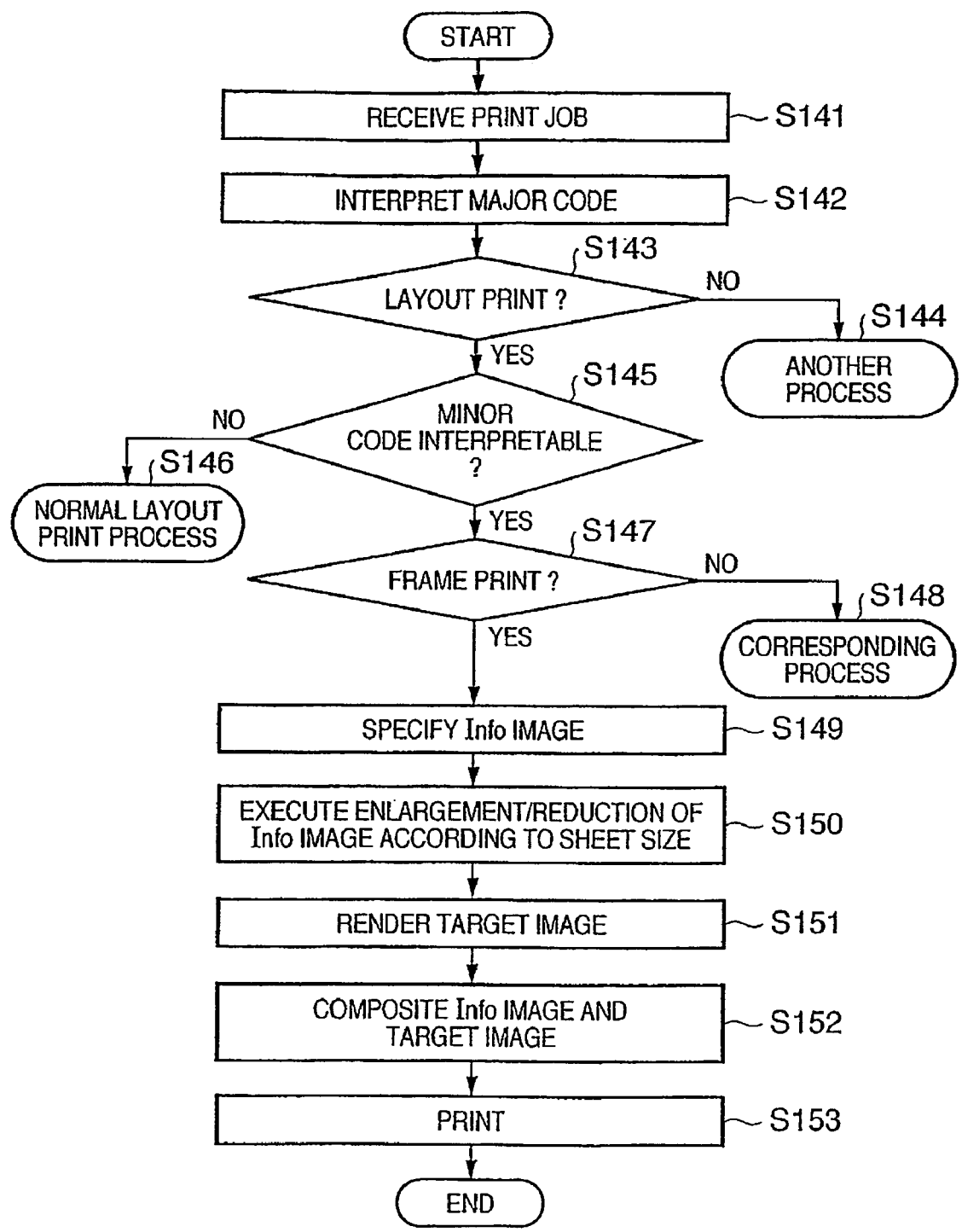

F I G. 18

↑ SUPPORT CHUNK

| CHUNK TYPE | MEANING | |
|---|---|---|
| IHDR | IMAGE HEADER | ~2201 |
| PLTE | PALLET | ~2202 |
| IDAT | START OF IMAGE DATA | ~2203 |
| IEND | END OF IMAGE DATA | ~2204 |
| bKGB | DEFINITION OF BACKGROUND COLOR | ~2211 |
| tRNS | SETUP OF TRANSPARENCY COLOR | ~2212 |
| pHYs | RESOLUTION | ~2213 |
| cHRM | WHITE POINT AND CHROMATICITY COORDINATE | ~2214 |
| gAMA | GAMMA VALUE | ~2215 |
| hIST | HISTOGRAM | ~2216 |
| sBIT | Significant bits | ~2217 |
| tIME | LAST UPDATE DATE | ~2218 |
| tEXt | TEXT DATA | ~2219 |
| zTXt | COMPRESSED TEXT DATA | ~2220 |

2200 = {2201–2204}
2210 = {2211–2220}

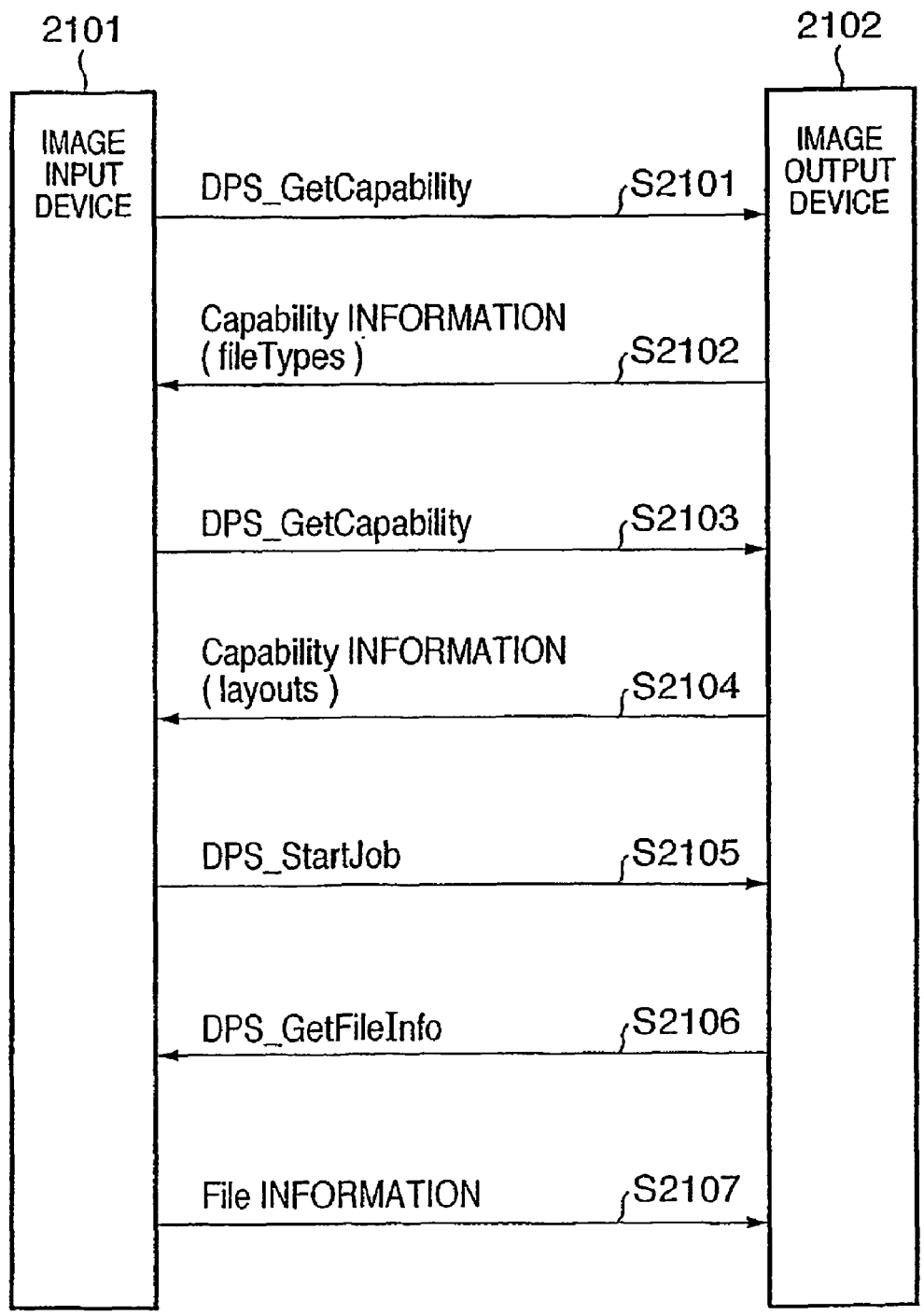

RECORDING APPARATUS IMAGE SUPPLY DEVICE AND RECORDING SYSTEM AND CONTROL METHOD AND PROGRAM FOR IMAGE LAYOUT DETERMINATION

TECHNICAL FIELD

The present invention relates to a recording apparatus for recording an image on a recording medium on the basis of image data supplied from an image supply device, an image supply device, and a recording system, and a control method and program thereof.

BACKGROUND ART

In recent years, digital cameras (image sensing devices) which can sense an image and can convert the sensed image into digital image data by a simple operation have been popularly used. When an image sensed by such camera is printed and is used as a photograph, it is a common practice to temporarily download the sensed digital image data from a digital camera to a PC (computer), to execute an image process by that PC, and to output the processed image data from the PC to a color printer, thus printing an image.

By contrast, a color print system which allows a digital camera to directly transfer digital image data to a color printer without the intervention of any PC and can print it out (to be referred to as a direct print process hereinafter), a so-called photo-direct (PD) printer which can receive a memory card, which is mounted on a digital camera and stores sensed images, and can print sensed images, and the like have recently been developed (see Japanese Patent Laid-Open No. 2003-061034).

Such direct print process is originally a model-dependent print function that can be implemented between a camera and printer of an identical manufacturer. However, in recent years, the standardization in these industries has progressed, and an environment that allows a direct print process by connecting a camera and printer of different manufacturers irrespective of manufacturers has been created. For example, a standard called PictBridge which is officially published from CIPA is a typical one that allows a direct print process even when a camera and printer of different manufacturers are connected.

Also, print functions that can be implemented by the direct print process have been diversified year by year. As such print functions, not only a print function that simply prints a single image sensed by a digital camera on a single print medium like a conventional silver halide photograph, but also a print function that prints a plurality of images on a single print medium (to be referred to as a layout print process hereinafter), and the like can be easily done according to the user's favor.

Also, since image information obtained by a digital camera is digital data, various print functions that utilize features of such digital data have been proposed. For example, a function (overlay print) that is not a simple layout print process but overlays and prints a plurality of image data is considered as one of functions which will be frequently used in the future. Of such overlay print mode, a print function that selects one image as a background image, and overlays another image on that background image to print them as if two images were printed as a single image (to be referred to as a frame print process hereinafter) is expected to be implemented by the direct print process soon.

In this case, a background image may be a natural image. For example, a frame print process that uses an image, which includes text information such as a greeting message, the address of a new house, and the like in case of a greeting card after a wedding, as a background image (an image to be set as a background will be referred to an Info image hereinafter), and overlays and prints a newly wed's image (to be referred to as a Target image hereinafter) on that Info image is required to be implemented by the direct print process. Note that the text information of the Info image may be saved as character codes such as ASCII codes or the like. However, for example, the Info image may be an image file such as a JPEG Image or the like by handling text as image information.

Although the environment of the standardization of the interface specifications and multi-functions of the direct print process is in order, at least one of a device that supplies image data and an image output device that receives the image data and prints it must recognize functions (to be referred to as capability data hereinafter) of the other, so as to implement a manufacturer-independent direct print process set up by the direct print process using PictBridge. If the user executes a direct print process by operating the interface of the camera, the camera must acquire capability data of a printer used to print an image. To this end, commands required to exchange capability data between the camera and printer must be defined, the communication specifications of these commands must be defined, and commands must be exchanged according to the communication specifications. In this way, each other's functions are recognized by parsing the commands, and a print command (to be referred to as a print job hereinafter) according to a print instruction from the user must be appropriately generated in accordance with the capability data of the printer. That is, the camera must be designed to be able to generate a plurality of print jobs in correspondence with the capability data of printers, thus imposing a heavy load on the camera.

Since a direct print process between models of an identical manufacturer need only be executed by rules specified in advance by the manufacturer, it is easy to reduce the aforementioned load. By sufficiently repeating connection tests before delivery of products, it is also easy to confirm if all functions operate without problems before bringing products to the market. However, in order to guarantee connections with many unspecified devices according to the aforementioned standardization, bylaws must be set in detail, and the reliability of connection between devices which meet for the first time in the market must be guaranteed while confirming if the bylaws are satisfied. In such situation, a heavy load is generated to implement an identical function, and a heavier load may be generated to implement advanced functions.

Practical problems will be explained below taking the layout and frame print processes as an example.

For example, a case will be examined below wherein [JPEG image of wedding greeting message] is used as an Info image, [photograph image of newly wed] is used as a Target image, and these Info and Target images are to be printed on a sheet such as a postcard. In such case, the Info and Target images preferably undergo a frame print process together to obtain a fine image. However, if a printer does not support a frame print function, but supports a layout print function, it is significant to execute a layout print process that prints these Info and Target images on a single sheet (to be referred to as a 2-Up process hereinafter). That is, since the Info and Target images in this case are associated with each other, if they are printed on independent sheets, they become insignificant images. Especially, when images to be printed are not only these two images but also a plurality of images stored in a memory of a camera, it is significant that associated images are printed on a single sheet.

Upon executing the direct print process, the camera must confirm using a command that inquires capability data of a printer if that printer has a layout print function and frame print function. If the printer has the frame print function, the camera must send inquiries concerning various capability data such as a method of specifying Info and Target images, the number of Info images that can be used in the frame print process if a plurality of Info images must be set, and so forth, and must parse exchanged data to determine functions of the printer. Then, the camera must specify functions that can be and cannot be executed by that printer, and must generate a print job which can execute an appropriate print process according to the specified result. For example, the camera must generate different print jobs depending on functions supported by the printer (e.g., the layout print function only, both the layout and frame print functions, or the frame print function only), and must send them to the printer.

Although a further detailed explanation will be omitted, if other additional functions, which are not described here, are available, the camera must have a function of generating a print job in consideration of combinations with these functions. If the camera sends a command premised on the frame print function to the printer that does not support the frame print function, the printer cannot interpret the received print job. In a general communication specification, such communication specification that cannot be interpreted is ignored. Hence, no print process is executed consequently. Or depending on the specification of the print job or the printer, an image that the user did not intend may be printed according to information that can be interpreted only half way.

In the frame print process, most of loads required to attain the frame print process are imposed on the printer. Hence, in a conventional system that executes the direct print process by connecting a camera and printer of an identical manufacturer, the camera need only pass information that specifies images to be printed selected by the user, and additional function information that specifies a layout or frame print function to the printer in most cases. However, in the direct print process of the standard specification, since an unspecified camera and printer are connected for the first time in the market to execute the direct print process, a larger number of information than the conventional communication sequence must be exchanged. As a result, since the communication load becomes heavier, and the program size increases, the camera may consequently cease to support these complicated functions. When this happens, although the user has a printer with advanced additional functions such as a frame print function and the like, since cameras that support such advanced additional functions do not prevail, the functions of the printer cannot be used.

DISCLOSURE OF INVENTION

The present invention has been made in consideration of the above problems, and a characteristic feature of the present invention is to provide a recording apparatus, an image supply device, and a recording system, and its control method and program, which allow an image supply device to designate a recording mode of the recording apparatus, and allow the recording apparatus to execute a recording process according to its recording functions.

According to an aspect of the present invention, there is provided with a recording apparatus for recording an image on a recording medium on the basis of image data supplied from an image supply device, the apparatus comprising: reception means for receiving a recording command with a hierarchical structure, which is transmitted from the image supply device; first determination means for determining whether an upper layer of the recording command designates a first recording mode that records a plurality of images on a single recording medium; second determination means for, in a case where the first determination means determines that the first recording mode is designated, determining a second recording mode designated by a lower layer of the upper layer; and control means for controlling to execute, in a case where the second determination means cannot determine the second recording mode, a recording operation according to the first recording mode determined by the first determination means, and to execute, in a case where the second determination means can determine the second recording mode, a recording operation according to the second recording mode determined by the second determination means.

According to an aspect of the present invention, there is provided with a recording system including an image supply device and a recording apparatus, and recording an image on a recording medium by the recording apparatus on the basis of image data supplied from the image supply device. In the system, the image supply device transmits a recording command with a hierarchical structure to the recording apparatus, and the recording apparatus comprises: reception means for receiving a recording command with a hierarchical structure, which was transmitted from the image supply device; first determination means for determining whether an upper layer of the recording command designates a first recording mode that records a plurality of images on a single recording medium; second determination means for, in a case where the first determination means determines that the first recording mode is designated, determining a second recording mode designated by a lower layer of the upper layer; and control means for controlling to execute, in a case where the second determination means cannot determine the second recording mode, a recording operation according to the first recording mode determined by the first determination means, and to execute, in a case where the second determination means can determine the second recording mode, a recording operation according to the second recording mode determined by the second determination means.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the descriptions, serve to explain the principle of the invention.

FIG. 7 depicts a view for explaining an actual example of a print start command issued by the DSC according to the embodiment of the present invention;

FIGS. 8A and 8B depict views for explaining JobStatus and DeviceStatus which are sent from the PD printer to the DSC according to the embodiment of the present invention;

FIGS. 9A and 9B depict views for explaining exchange of capability data of the PD printer-according to the embodiment of the present invention, in which FIG. 9A shows an example of a capability request command from the DSC to the PD printer, and FIG. 9B shows a response command from the PD printer to the DSC;

FIG. 10 depicts a view for explaining the code format of capability data which is sent from the PD printer to the DSC according to the embodiment of the present invention;

FIGS. 11A and 11B depict views for explaining an example of acquisition of file information of an image to be printed according to the embodiment of the present invention, in which FIG. 11A shows an example of a file request command from the PD printer to the DSC, and FIG. 11B shows an example of a command upon sending an image file from the DSC to the PD printer;

FIG. 12 is a flowchart for explaining processes from when a print job is issued until print data is generated in a direct print system according to the first embodiment;

FIG. 13 depicts a view for explaining an example of a print result in the direct print system according to the first embodiment;

FIG. 14 is a flowchart for explaining a layout print process and frame print process in the PD printer according to the first embodiment;

FIG. 18 depicts a view for explaining the types of data chunks which form the PNG image format;

FIG. 19 is a flowchart for explaining the flow of frame print instructions between an image input device and image output device according to the second embodiment;

BEST MODE FOR CARRYING OUT THE INVENTION

Preferred embodiments of the present invention will now be described in detail in accordance with the accompanying drawings.

<Overview of Printer>

Figure 1:
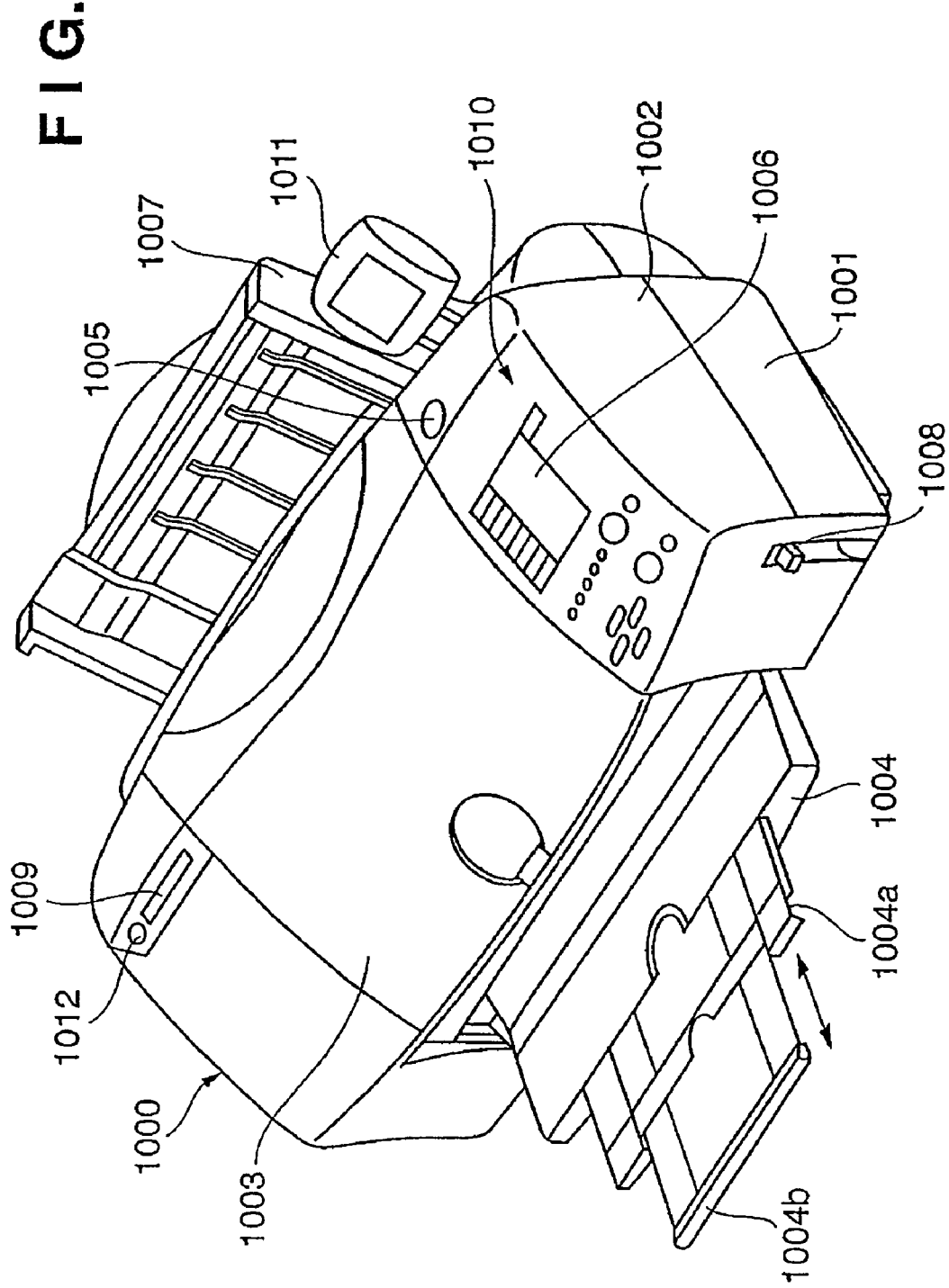
FIG. 1 depicts a schematic perspective view of a PD printer according to an embodiment of the present invention.

FIG. 1 depicts a schematic perspective view of a photo-direct printer device (to be referred to as a PD sprinter hereinafter) 1000 according to an embodiment of the present invention. This PD printer 1000 has a function of printing data received from a host computer (PC) as a normal PC printer, and a function of printing image data directly read from a storage medium such as a memory card or the like, and printing image data received from a digital camera, PDA, or the like.

Referring to FIG. 1, a main body which forms a housing of the PD printer 1000 according to this embodiment has a lower case 1001, upper case 1002, access cover 1003, and exhaust tray 1004 as exterior members. The lower case 1001 nearly forms the lower half portion of the PD printer 1000, and the upper case 1002 nearly forms the upper half portion of the main body. By combining these cases, a hollow structure which has a storage space that stores mechanisms to be described later is formed. Openings are respectively formed on the upper and front surfaces of the main body. One end portion of the exhaust tray 1004 is rotatably held by the lower case 1001, and rotation of the tray 1004 opens/closes the opening formed on the front surface of the lower case 1001. Hence, upon executing a print operation, the exhaust tray 1004 is rotated toward the front surface side to open the opening, so that printed sheets (including plain paper, dedicated paper, resin sheet, and the like; to be simply referred to as a sheet hereinafter) can be exhausted from the opening. The exhausted print sheets are stacked on the exhaust tray 1004 in turn. The exhaust tray 1004 stores two auxiliary trays 1004a and 1004b. When these auxiliary trays are pulled out as needed, the loading area of sheets can be enlarged/reduced in three steps.

One end portion of the access cover 1003 is rotatably held by the upper case 1002 to be able to open/close the opening formed on the upper surface of the main body. When the access cover 1003 is opened, a printhead cartridge (not shown), ink tanks (not shown), or the like housed in the main body can be exchanged. Although not shown, when the access cover 1003 is opened/closed, a projection formed on the rear surface of the cover 1003 rotates a cover open/close lever. By detecting the rotation position of the lever using a microswitch or the like, the open/close state of the access cover 1003 is detected.

A power key 1005 is arranged on the upper surface of the upper case 1002. A control panel 1010 which comprises a liquid crystal display 1006, various key switches, and the like is provided on the right side of the upper case 1002. The structure of the control panel 1010 will be described in detail later with reference to FIG. 2. Reference numeral 1007 denotes an automatic feeder which automatically feeds a sheet into the device main body. Reference numeral 1008 denotes a paper gap select lever which is used to adjust the gap between the printhead and sheet. Reference numeral 1009 denotes a card slot which receives an adapter that can receive a memory card. Via this adapter, image data stored in the memory card can be directly read and printed. As this memory card (PC), for example, a Compact Flash® memory card, smart media card, memory stick, and the like are available. Reference numeral 1011 denotes a viewer (liquid crystal display unit) which is detachable from the main body of this PD printer 1000, and is used to display an image for one frame, index images, and the like, when the user wants to search images stored in the PC card for an image to be printed. Reference numeral 1012 denotes a USB terminal used to connect a digital camera (to be described later). Also, another USB connector used to connect a personal computer (PC) is provided on the rear surface of this PD printer 1000.

<Overview of Printer Console>

Figure 2:
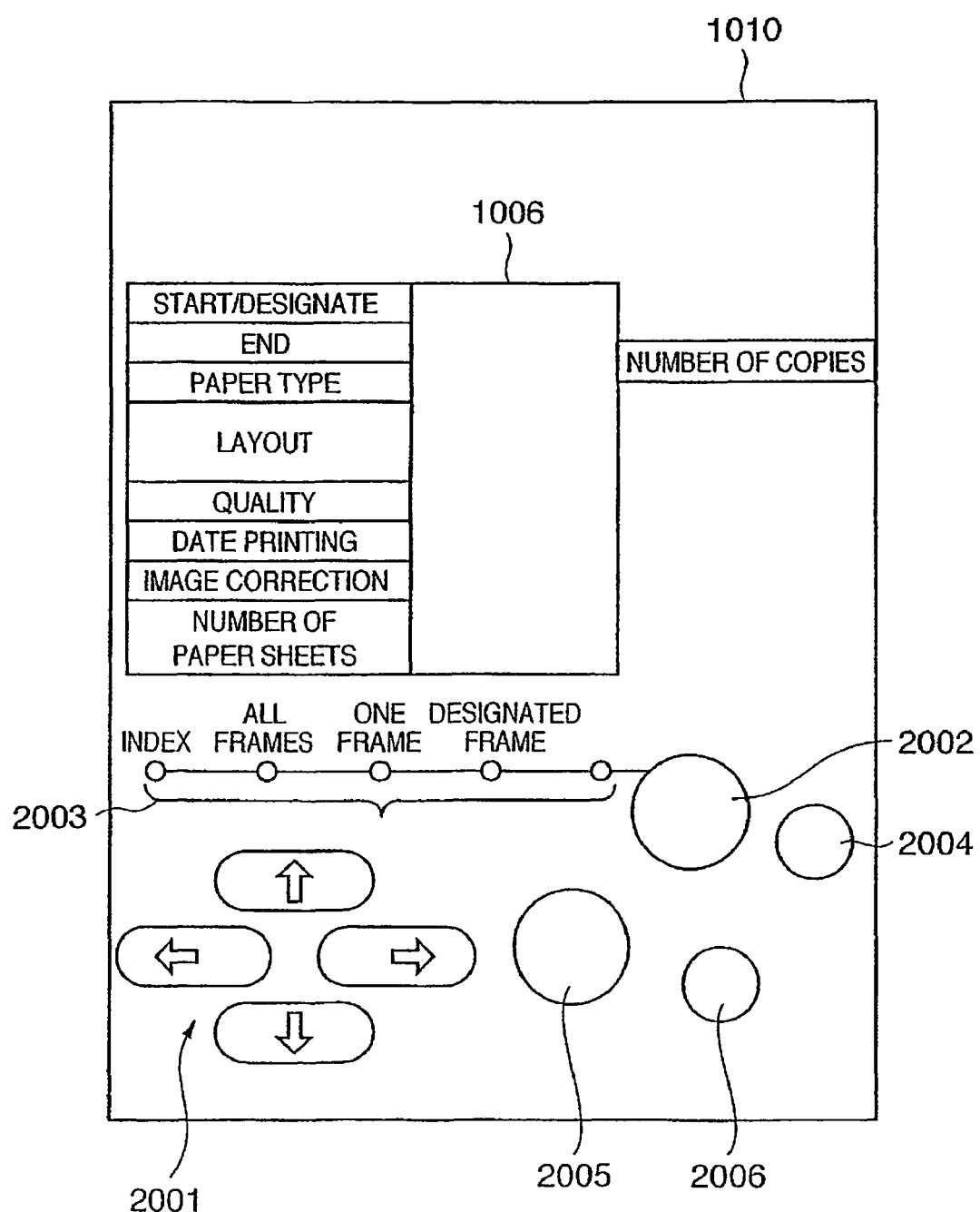
FIG. 2 depicts a schematic view of a control panel of the PD printer according to the embodiment of the present invention.

FIG. 2 depicts a schematic view of the control panel 1010 of the PD printer 1000 according to this embodiment.

Referring to FIG. 2, the liquid crystal display unit 1006 displays menu items used to make various setups of data associated with item names printed on the right and left sides of the unit 1006. The items displayed here include, e.g., the first photograph number of a photograph image to be printed of a plurality of photograph image files or designated frame number (start frame designation/print frame designation), the last photograph number of a photograph image to be printed at the end of a print process (end), the number of prints (number of copies), the type of sheet used in a print process (paper type), the setup of the number of photographs to be printed per sheet (layout), designation of print quality (quality), designation as to whether or not to print a photographing date (date printing), designation as to whether or not to print a photograph after correction (image correction), display of the number of sheets required for the print process (number of sheets), and the like. These items are selected or designated using cursor keys 2001. Reference numeral 2002 denotes a mode key. Every time this key is pressed, a print mode (index print, all-frame print, one-frame print, designated-frame print, and the like) can be switched, and a corresponding one of LEDs 2003 is turned on in accordance with the selected print mode. Reference numeral 2004 denotes a maintenance key which is used to do maintenance of the printer (e.g., cleaning of the printhead, and the like). Reference numeral 2005 denotes a print start key which is pressed when the start of a print process is instructed or when the maintenance setup is settled. Reference numeral 2006 denotes a print cancel key which is pressed when a print process or maintenance is canceled.

<Overview of Printer Electric Specification>

The arrangement of principal part associated with the control of the PD printer 1000 according to this embodiment will be described below with reference to FIG. 3. Note that the same reference numerals in FIG. 3 denote parts common to those in the above drawings, and a description thereof will be omitted.

Figure 3:
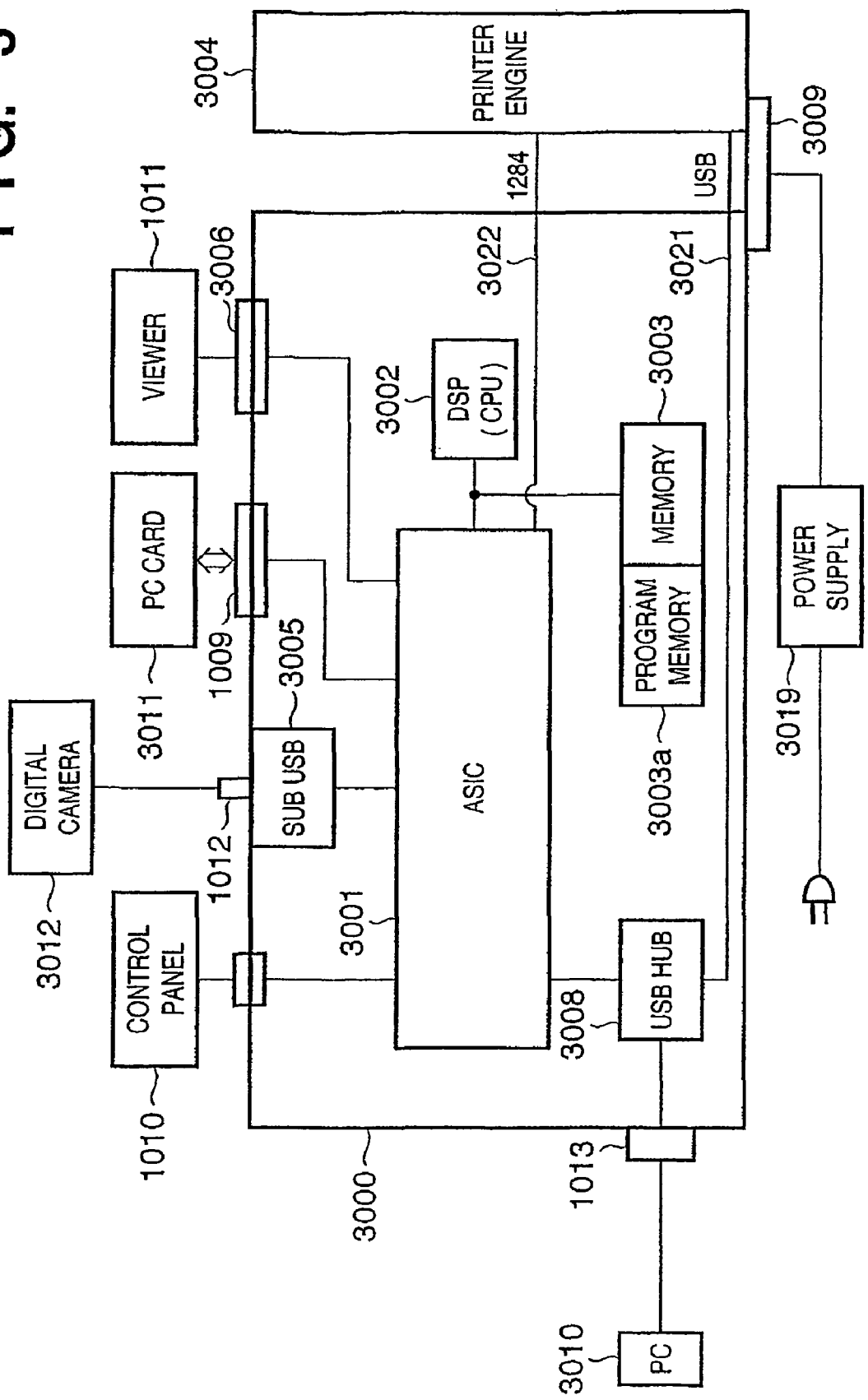
FIG. 3 is a block diagram showing the arrangement of principal part associated with control of the PD printer according to the embodiment of the present invention.

Referring to FIG. 3, reference numeral 3000 denotes a controller (control board). Reference numeral 3001 denotes an ASIC (application specific LSI). Reference numeral 3002 denotes a DSP (digital signal processor), which includes a CPU and executes various control processes to be described later, and image processes such as conversion from a luminance signal (RGB) into a density signal (CMYK), scaling, gamma conversion, error diffusion, and the like. Reference numeral 3003 denotes a memory, which has a program memory 3003a for storing a control program to be executed by the CPU of the DSP 3002, a RAM area for storing a running program, and a memory area that serves as a work area for storing image data and the like. Reference numeral 3004 denotes a printer engine. In this embodiment, the printer is equipped with a printer engine of an ink-jet printer which prints a color image using a plurality of color inks. Reference numeral 3005 denotes a USB connector as a port for connecting a digital camera (DSC) 3012. Reference numeral 3006 denotes a connector for connecting the viewer 1011. Reference numeral 3008 denotes a USB hub (USB HUB). When the PD printer 1000 executes a print process based on image data from a PC 3010, the USB hub 3008 allows data received from the PC 3010 to pass through it, and outputs the data to the printer engine 3004 via a USB 3021. In this way, the PC 3010 connected to the printer can execute a print process by directly exchanging data, signals, and the like with the printer engine 3004 (the printer serves as a normal PC printer). Reference numeral 3009 denotes a power supply connector, which inputs a DC voltage which is converted from commercial AC power by a power supply 3011. The PC 3010 is a general personal computer. Reference numeral 3011 denotes a memory card (PC card) mentioned above; and numeral 3012 denotes a digital camera (DSC: Digital Still Camera).

Note that signals are exchanged between this controller 3000 and printer engine 3004 via the aforementioned USB 3021 or an IEEE1284 bus 3022.

<Overview of Digital Camera>

Figure 4:
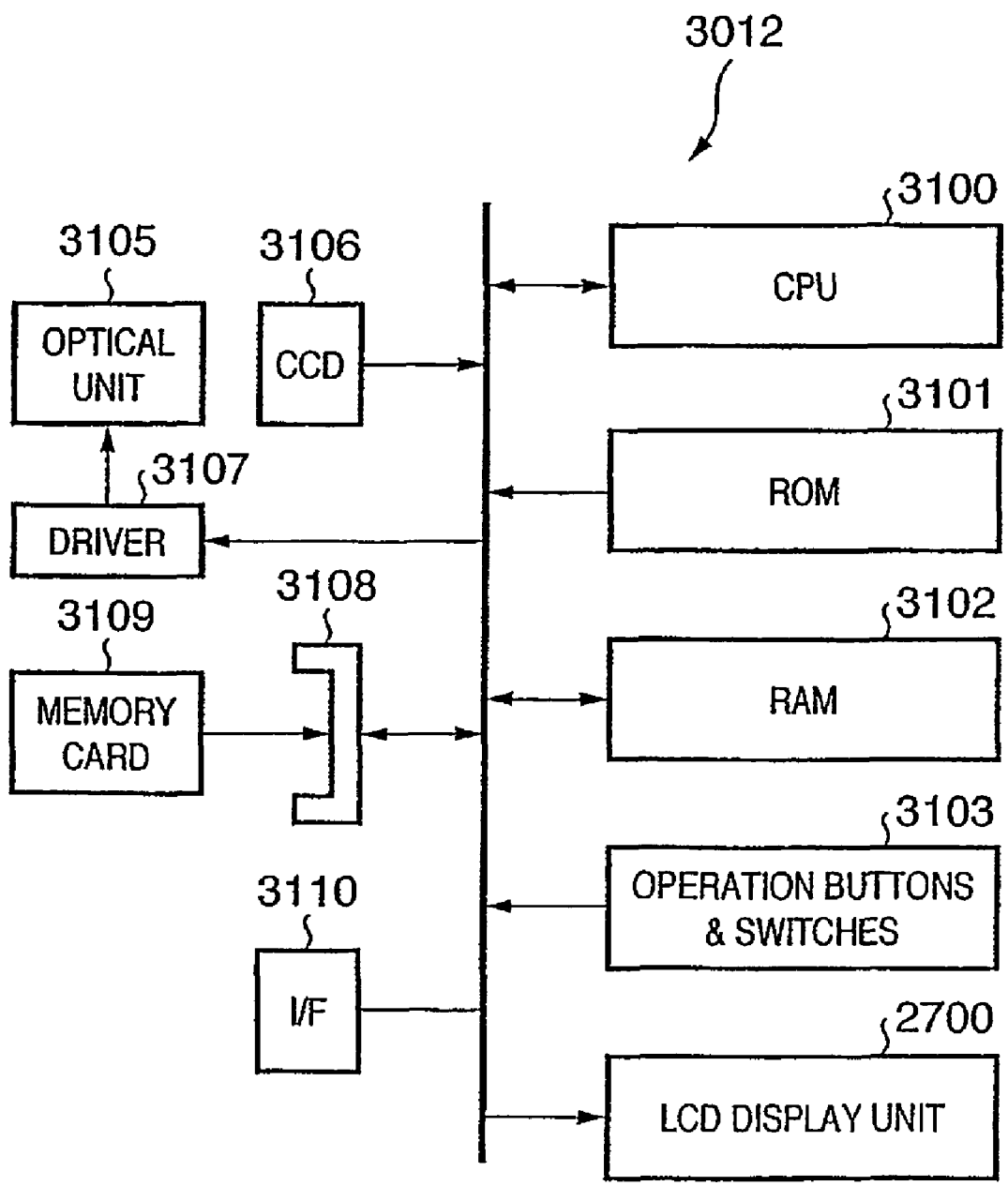
FIG. 4 is a block diagram showing the arrangement of a DSC according to the embodiment of the present invention.

FIG. 4 is a block diagram showing the arrangement of the DSC (digital camera) 3012 according to this embodiment.

Referring to FIG. 4, reference numeral 3100 denotes a CPU which controls the overall DSC 3012; and numeral 3101 denotes a ROM that stores a program for the processing sequence by the CPU 3100. Reference numeral 3102 denotes a RAM which is used as a work area of the CPU 3100; and numeral 3103 denotes a switch group which is used to make various operations, and includes a shutter, mode switch, select switch, cursor keys, and the like. Reference numeral 2700 denotes a liquid crystal display unit which is used to display a video picture that is captured currently, and images photographed and stored in the memory card, and to display a menu upon making various setups. Reference numeral 3105 denotes an optical unit which mainly comprises a lens and its drive system. Reference numeral 3106 denotes a CCD element; and numeral 3107 denotes a driver for controlling to drive the optical unit 3105 under the control of the CPU 3100. Reference numeral 3108 denotes a connector used to connect a storage medium 3109 (Compact Flash® memory card, smart media, or the like); and numeral 3110 denotes a USB interface (slave side of the USB) used to connect a PC or the PD printer in this embodiment.

<Overview of Camera/Printer Connection>

Figure 5:
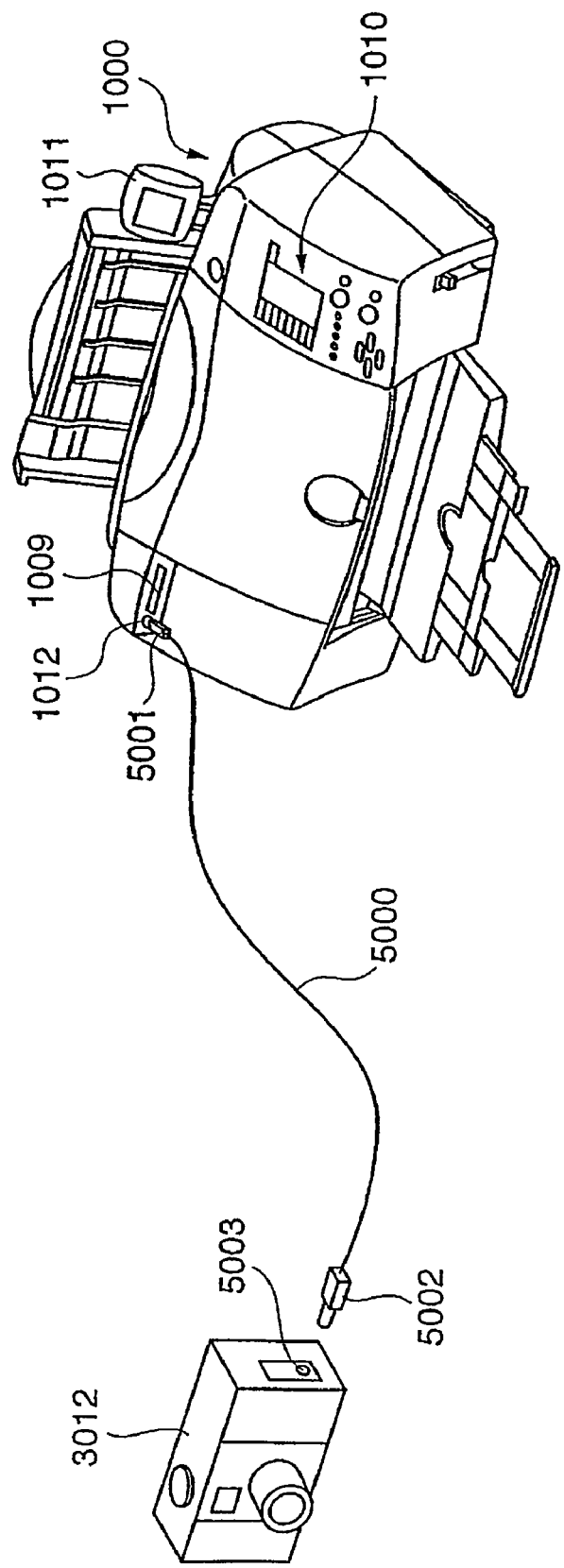
FIG. 5 depicts a view for explaining connection between the PD printer and the digital camera according to the embodiment of the present invention.

FIG. 5 depicts a view for explaining connection between the PD printer 1000 and DSC 3012 according to this embodiment. The same reference numerals in FIG. 5 denote parts common to those in the above drawings, and a description thereof will be omitted.

Referring to FIG. 5, a cable 5000 comprises a connector 5001 which is connected to the connector 1012 of the PD printer 1000, and a connector 5002 which is connected to a connector 5003 of the digital camera 3012. The digital camera 3012 can output image data saved in its internal memory via the connector 5003. Note that the digital camera 3012 can adopt various arrangements, e.g., an arrangement that comprises an internal memory as storage means, an arrangement that comprises a slot for receiving a detachable memory card, and so forth. When the PD printer 1000 and digital camera 3012 are connected via the cable 5000 shown in FIG. 5, image data output from the digital camera 3012 can be directly printed by the PD printer 1000.

An overview of the operation in the print system including the DSC 3012 and PD printer 1000 based on the above arrangements will be described below. Note that in the print system according to this embodiment, the DSC 3012 and PD printer 1000 can make operations that follow the specification of a sequence DPS (Direct Print System) according to this embodiment.

<Overview of Signal Flow of DPS>

Figure 6:
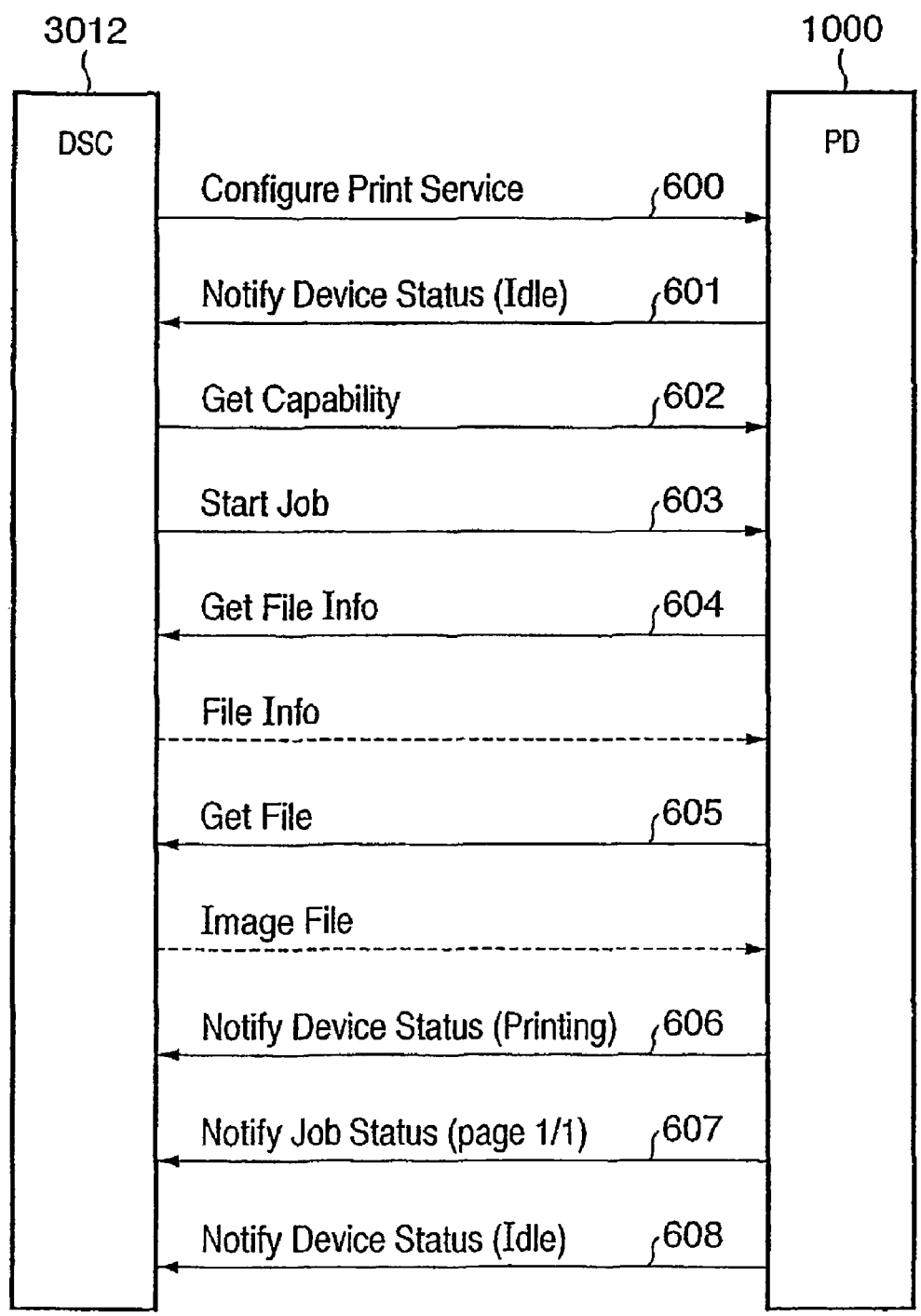
FIG. 6 is a chart for explaining exchange of commands between the PD printer and DSC in a print system according to the embodiment of the present invention.

FIG. 6 depicts a chart for explaining a rough signal flow when the DSC 3012 issues a print request to the PD printer 1000 to execute a print process in the print system according to this embodiment.

This processing sequence is executed after the PD printer 1000 and DSC 3012 are connected via the USB cable 5000 and confirm each other that they comply with the DPS specification. The DSC 3012 sends "ConfigurePrintService" to the PD printer 1000 to check the status of the PD printer 1000 (600). In response to this, the PD printer 1000 notifies its status ("idle" in this case) at that time (601). Since the PD printer 1000 is "idle" in this case, the DSC 3012 sends an inquiry of capability data of the PD printer 1000 (602), and issues a print start request (StartJob) according to the capability data (603). Note that this print start request is issued from the DSC 3012 to the PD printer 1000 under the condition that "newJobOK" (to be described later) in status information sent from the PD printer 1000 is "True" (601).

In response to this print start request, the PD printer 1000 requests the DSC 3012 to send file information on the basis of the file ID of designated image data to be printed (GetFileInfo) (604). In response to this request, the DSC 3012 sends the requested file information (FileInfo). This file information includes information such as a file size and the like. When the PD printer 1000 determines that it can receive and process the file information, it requests the DSC 3012 to send the file information (GetFile) (605). In response to this request, image data of the requested file (ImageFile) is sent from the DSC 3012 to the PD printer 1000. Status information indicating "Printing" is sent from the PD printer 1000 to the DSC 3012 using "NotifyDeviceStatus" (606). Upon completion of a print process for one page, the PD printer 1000 notifies the status using "NotifyJobStatus" (607) at the beginning of the process for the next page. If only one page is to be printed, the PD printer 1000 notifies "idle" using "NotifyJobStatus" (608) (NotifyJobStatus(Idle)).

For example, in case of N-up print that lays out and prints a plurality of (N) images per one page, every time N images are printed, "NotifyJobStatus" (607) is sent from the PD printer 1000 to the DSC 3012. The issuance timings of "NotifyJobStatus" and "NotifyDeviceStatus" and the acquisition order of image data in this embodiment are a merely example, and various cases may occur depending on product implementations.

Note that this print process includes a case wherein the DSC 3012 transmits a print start request (StartJob), which includes the file IDs of image data to be printed together, to execute a print process, and a case wherein the DSC 3012 transmits a print start request (StartJob), which includes only the file ID of a DPOF file used in normal photo development, to the PD printer 1000, which interprets the DPOF file to acquire the file ID of required image data, and prints it out.

<Overview of Print Job>

FIG. 7 depicts a view for explaining an actual example of a print start request command issued from the DSC 3012 to the PD printer 1000.

Referring to FIG. 7, reference numeral 720 denotes the configuration (jobConfig) of this print job; and numeral 721 denotes print information (printInfo).

The configuration 720 will be explained first. A tag 700 designates image quality to be printed (quality), which includes, e.g., "standard", "high image quality", and the like. A tag 701 designates a paper size (paperSize); and a tag 702 designates a paper type (papertype), which includes, e.g., "plain paper", "photo paper", "ink-jet dedicated paper", and the like. A tag 703 designates a type (fileType) of an image file to be printed. For example, when the DPOF is used, it is designated by this tag. A tag 704 designates the presence/absence of date print (datePrint); numeral 705 denotes the presence/absence of file name print (fileNamePrint); numeral 706 denotes an image optimization ON/OFF (imageOptimize); numeral 707 denotes a fixed size print (fixedSize); and numeral 708 denotes the presence/absence of print of a designated range of an image (cropping). The print information 721 includes a file ID (fileID) 709 and date information (date) 710.

FIGS. 8A and 8B depict views for explaining information included in JobStatus and DeviceStatus above. Note that JobStatus in FIG. 8A and DeviceStatus in FIG. 8B are sent from the PD printer 1000 to the DSC 3012. The DSC 3012 can send a transmission request of these kinds of information to the PD printer 1000 at an arbitrary timing.

Referring to FIG. 8A, "prtPID", "ImagePath", and "copyID" are enabled when print of a DPOF file is designated. Note that "prtPID" means identification information (ID) of a print section designated by the DPOF file, "ImagePath" means path information required to specify an image file designated by the DPOF file, and "copyID" means which of pages is being printed in practice upon designating a print process of a plurality of pages. In case of print of a DPOF file, the DSC 3012 describes "fileID" of the DPOF file in a print start request (StartJob), and transmits the request to the PD printer 1000. In response to this, the PD printer 1000 can start printing of the DPOF file. The PD printer 1000 acquires a DPOF file based on "fileID" of the DPOF file, and executes "GetFileID" to specify "fileID" of an image file designated in the DPOF file. The PD printer 1000 then requests the DSC 3012 to send the image file, and acquires the image data. In this manner, an image designated by the DPOF file can be printed. During execution of the print process based on the DPOF file, the PD printer 1000 notifies the DSC 3012 of "prtPID", "ImagePath", and "copyID" which indicate the current status of the print process using "NotifyJobStatus".

When the print process of the DPOF file is interrupted for some reason, and is restarted, the print process is restarted from the head of a page, the print process of which is canceled.

"progress" indicates a page which is currently printed of the designated number of pages to be printed (N/T). Note that N indicates the current print page, and T indicates the total number of pages to be printed. Also, "imagePrinted" indicates the number of printed images.

DeviceStatus shown in FIG. 8B will be explained below.

"dpsPrintServiceStatus" means the status of the PD printer 1000, and is sent to the DSC 3012. This status information includes idle, print, and pause states. "jobEndReason" means end status of a print process, and is sent to the DSC 3012 upon completion of the print process of the last page. "errorStatus" means error status, and is notified when an error has occurred. "errorReason" means the reason for occurrence of the error, and is sent together with "errorStatus". "disconnectEnable" means that a print process can be made even when the USB cable 5000 is disconnected, and is sent from the PD printer 1000 to the DSC 3012. "CapabilityChanged" means that capability data in the PD printer 1000 has changed, and is sent to the DSC 3012. "newJobOK" means that the PD printer 1000 is ready to receive a print request, and is sent to the DSC 3012.

<getCapability>

FIGS. 9A and 9B depict views for explaining an actual example of a printer capability acquisition method issued from the DSC 3012 to the PD printer 1000.

FIG. 9A depicts a view for explaining a capability request command of the PD printer 1000 to be sent from the DSC 3012 to the PD printer 1000.

In the example of FIG. 9A, a capability acquisition request is issued by <getCapability> and </getCapability>, and an inquiry as to whether or not the PD printer 1000 has a layout print function as capability is issued by <layouts/> 901 bounded by <capability> and </capability>.

FIG. 9B shows an example of capability data returned from the PD printer 1000 to the DSC 3012 in response to the capability request in FIG. 9A.

In FIG. 9B, layout information 904 bounded by <layouts> 903 and </layouts/> 905 in capability information bounded by <capability> 902 and </capability> 906 notifies a layout function of the PD printer 1000.

As can be seen from FIG. 9B, in this embodiment, capability data are sent as 8-digit codes ("57000000", "57010000", "57020000") from the PD printer 1000 to the DSC 3012. In this embodiment, layout capability is specified as a code, the upper 2 digits of which start with "57", and the next 2 digits indicate layout information, i.e., the number of images that can be printed per one sheet. That is, the upper 4 digits "5701" indicate that a layout print process that prints one image per one sheet is allowed, and "5702" indicate that the printer has a layout print function that prints two images per one sheet. Note that the upper 4 digits "5700" indicate a mode which makes a layout print process using a default layout of the PD printer 1000. That is, in the example of FIG. 9B, the layout print capability data of the PD printer 1000 indicate that the printer has three different layout print functions, i.e., a layout print function that prints one image per one sheet, a layout print function that prints two images per one sheet, and the default layout print function of the PD printer 1000.

In FIGS. 9A and 9B, the method of exchanging capability data associated with the layout print function has been discussed. However, a function that can be confirmed by capability data is not limited to the layout print function. For example, there are various kinds of capability data: capability data about the types of sheets that can be printed by the PD printer 1000; capability data about the sheet sizes supported by the PD printer 1000; capability data about the file types of image data supported by the printer 1000; capability data indicating whether or not the printer 1000 can additionally print a date or file name to an image; capability data about print modes supported by the printer 1000; capability data about the presence/absence of automatic correction functions of an image supported by the printer 1000; and so forth. However, a description of detailed communication specifications of these capability data will be omitted.

FIG. 10 depicts a view for explaining an example of the configuration of a code which is used in the direct print system according to this embodiment so as to notify status and the like from the PD printer 1000 to the DSC 3012. As described above, each code has 8 digits, and a numerical value of each digit is a hexadecimal code.

Note that the upper 4 digits "XXXX" form a major code, and the lower 4 digits "YYYY" form a minor code. When this code is applied to the layout information 904 in FIG. 9B, the major code of the upper 4 digits indicates a layout print function, and the number of images to be printed per one sheet. The minor code specifies more details of capability data indicated by the major code.

For example, in case of a layout print function that prints two images per one sheet, the major code="5702", and the minor code of the lower 4 digits can designate a layout of these two images to be printed on one sheet. For example, when the minor code that follows the major code "5702" is "0000", it designates a print layout which prints two images laid out at upper and lower positions (or right and left positions depending on a size). When the minor code is "0001", it designates a print layout that allows an overlay print process of two images.

In this embodiment, the PD printer 1000 notifies the DSC 3012 of its print function capability data by sending 8-digit codes indicating capability data to the DSC 3012. Note that the 8-digit code is formed of a major code of upper 4 digits, and a minor code of lower 4 digits, i.e., a combination of two codes having different recognition levels: the major code which can always be recognized by general cameras, and the minor code which is likely to be skipped or not recognized by some cameras. That is, the PD printer 1000 can notify the DSC 3012 that it has capability that allows a layout print function of two images, and has two layouts, i.e., a layout print-function of an orthodox layout which merely prints two images laid out at upper and lower or right and left positions ("57020000"), and a complicated layout print function that executes an overlay print process of two images ("57020001").

When the DSC that receives this capability is a camera that can understand only the major code, only a message "layout print of two images is selectable" is displayed on a UI of that DSC. On the other hand, if the DSC can also recognize the minor code, a UI that allows to designate a layout of two images in the layout print process is displayed. Hence, the user of that DSC can set various print layouts.

As described above, since a plurality of levels of information can be transmitted by a single code, that code can support layout print processes under various conditions.

In this embodiment, a layout print function and a frame print function as one print pattern of this layout print function are expressed by one code. Adverse effects encountered if these functions are expressed by independent codes will be briefly explained below.

If these two codes are independent codes, the control may be done as follows. That is, the DSC requests the PD printer to send capability data of the layout print function of the printer by <layouts> of <getCapability>, as described above using FIG. 9A. In response to this request, the layout print function of the PD printer 1000 is transmitted and acquired. Next, another tag (e.g. <Frames> or the like) is defined as a tag required to acquire capability data of a frame print function, and the DSC requests the PD printer to send capability data of the frame print function, as shown in FIG. 9A. Since the frame print function has high subordinacy with respect to the layout print function, the PD printer 1000 may not be able to independently return only capability data of <Frames>.

Therefore, if the PD printer 1000 replies that it can support layout print functions from two to 64 images, the DSC 3012 must send inquiries about capability data of a frame print function using <Frames> for each of these plurality of layout print functions so as to identify if the PD printer 1000 has the frame print function. As a result, a heavy load is generated by exchange of capability information, and a long wait time is generated from when the user wants to execute a direct print process until the direct print function is ready for actual use.

Also, since many complicated communications are required between the DSC 3012 and PD printer 1000, the communication load becomes heavier. In addition, in order to make such complicated communications, a program that checks the communication results and controls to execute operations according to the checking results is required, and its program size becomes huge. Such problems result in a delay of the developing period and an increase in cost of a camera and printer. Unlike a PC, in case of a camera and printer which suffer limited CPU processing performance and memory size, such huge program size and high cost pose very serious problems.

However, according to this embodiment, the availability of a layout print function is notified using the major code of <layouts> capability data, and the presence/absence of a more special frame print function can be notified in association with the layout print function using the minor code of <layouts> capability data. In this manner, the heavy communication load and implementation load, long wait time required for the user, and the like can be greatly reduced.

Since the printer 1000 need only return identical capability data thereof irrespective of whether or not the DSC 3012 requests function information associated with the frame print function, the implementation load of a program in the printer 1000 can also be reduced.

<Info Image Specifying Method>

A method of specifying an image used as an Info image (background image) upon executing a frame print process will be explained below.

Information of the print condition is sent from the DSC 3012 to the PD printer 1000 using StartJob (a command that designates a print job), as has been explained using FIG. 7. An image to be printed is designated by a tag <fileID> (709 in FIG. 7). That is, a list of the handle numbers of print images is described in the tag 709 to specify images to be printed. Since FIG. 7 exemplifies not designation of a layout print process for printing a plurality of images per one sheet, but that of a print process for printing only one image, only one handle number (handle number "00000001") is described. However, in case of a layout print process for printing two images per one sheet, two handle numbers each expressed by 8 digits are sent in parallel.

When the handle numbers of images to be printed are sent to the PD printer 1000, the PD printer 1000 requests the DSC 3012 to send image files designated by these handle numbers prior to a print process. In this case, the PD printer 1000 must acquire information of images to prepare for reception of image files before the PD printer 1000 acquires image files.

FIGS. 11A and 11B show an example of commands required to exchange image data between the PD printer 1000 and DSC 3012.

FIG. 11A shows an example of a command sent when the PD printer 1000 requests the DSC 3012 to send image data with a handle name "00000001".

FIG. 11B shows an example wherein the DSC 3012 sends image data to the PD printer 1000 in response to the request. In this case, the DSC 3012 sends information: image file type <fileType> and image file size <fileSize> (number of bytes) to the PD printer 1000.

More specifically, for example, when this command is implemented on the PTP of USB, it is processed as follows. That is, the PD printer 1000 serving as a USB host receives "ObjectInfoDataset" of the handle numbers of designated images to be printed from the DSC 3012 serving as a USB slave. Note that this "ObjectInfoDataset" includes a plurality of data fields. For example, in case of acquisition of file type information, the file type can be specified based on the contents of "ObjectFormatCode" in these data fields. In PTP, "ObjectFormatCode" is expressed by a 4-digit hexadecimal code. An "ObjectFormatCode" table separately specifies a file type expressed by the code (e.g., JPEG, TIFF, GIF, or the like), and the file type can be specified based on this table. Also, a folder that stores a designated image to be printed can be specified from information of a data field of "ObjectInfoDataset".

Note that an overview of the file information acquisition method has been explained taking USB-PTP as an architecture under the transport layer as an example. Such file information can be generally acquired by most of interfaces although acquisition methods are different depending on interfaces.

Assume that Info images are saved in a specific folder in this embodiment. More specifically, a directory "¥Info¥" (folder) is created immediately under the root of a storage device (normally a memory card) that stores image files of the DSC 3012, and an Info image is stored in this folder. Hence, when a print job is input to the PD printer 1000 using "StartJob", the PD printer 1000 acquires a handle name of an image to be printed based on the <fileID> tag 709 in that command.

Prior to loading of an entity of an image file based on the handle name, the PD printer 1000 acquires detailed information of the image file. At this time, the PD printer 1000 acquires folder information which stores the image file. If the folder information is "¥Info¥", the PD printer 1000 determines that the image is an Info image. If an image is stored in a folder other than "¥Info¥", the PD printer 1000 determines that the image is a Target image. In this way, Info and Target images are discriminated from each other.

In this embodiment, the folder of Info images is specified as "¥Info¥". However, the folder name and location are not limited to such specific ones as long as a specific folder is used. Also, the number of folders that store Info images is not limited to one but a plurality of folders may be prepared.

Furthermore, Info and Target images may be discriminated from each other by specifying a folder of Target images in place of that of Info images.

Moreover, each Info image is specified by specifying its folder in this embodiment, but it may be specified based on "fileType", as a matter of course. For example, the file type of all Info images may be defined as GIF to specify Info images. However, with this method, GIF cannot be used for Target images. In such case, Info images can be specified by defining that the file name of each Info image starts from "Info".

In addition, an image file itself may have information. That is, information indicating that this image is an Info image may be embedded in the tag of the image file.

Furthermore, when the handle names of image files are described using the <fileID> tag, an Info image may be specified by the description order of the handle names of image files in the <fileID> tag so that an image designated by the first handle name in that tag is an Info image. In this case, the number of Info images is not limited to one in some print jobs. However, since the number of Info images can be uniquely determined by a print layout code described in the <Layouts> tag, Info images can be specified by the order described in the <fileID> tag.

After Info and Target images are specified as described above, various cases are allowed since a print process achieved using these images largely depends on implementation of products.

In this embodiment, when two images are laid out on a single sheet and undergo a frame print process, an Info image is printed on the entire surface of the sheet (an enlargement/reduction process is applied as needed at that time), and an overlay print of a Target image may be executed on the image. In this process, when Target and Info images with the same size undergo an overwrite print, the Info image is hidden. Hence, for example, the Target image is printed by barycentric alignment to have a size 70% that of the Info image in the vertical and horizontal directions. Hence, a character string and image included in the Info image are preferably described in upper, lower, right, and left open areas. In this embodiment, the file types of both the Info and Target images are a JPEG file in this embodiment. However, the present invention is not limited to this file type, as a matter of course.

In this embodiment, the overlay print process is simply an overwrite overlay print process. In addition, known overlay specifications such as a specification in which a Target image may have some transparency, and an Info image may be seen through the Target image, a method of applying an overlay process by making various arithmetic processes in an overlap region for respective pixels, and the like may be adopted.

Process of First Embodiment

FIG. 12 is a flowchart showing processes upon executing the layout and frame print processes in the direct print system according to the first embodiment of the present invention.

Before this process, when the DSC 3012 and PD printer 1000 are connected, a configuration process is done according to the specification (not shown) to establish a communication. Next, the two devices confirm each other if they are direct-print compatible products. With this process, the DSC 3012 acquires, from the PD printer 1000, print functions (capability data) that can be provided by the PD printer 1000 to present a UI to the user. The DSC 3012 forms a UI according to the acquired capability data and presents it to the user, and shifts to an idle state to wait for a print command from the user. As described above, since communications to be made by the DSC 3012 and PD printer 1000 at that time are minimized, the user's wait time can be shortened very much.

When the user determines an image which is to undergo a direct print process and a print specification by operating the UI of the DSC 3012, the DSC 3012 issues a print instruction to the PD printer 1000. As a result, the DSC 3012 converts the user's print instruction into a print job (i.e., "StartJob") and sends it to the PD printer 1000 in step S121.

Upon reception of the print job, the PD printer 1000 interprets the print job to acquire image data to be printed from the DSC 3012 in step S122. If the print specification does not indicate a frame print mode, the flow advances to step S124 to acquire "fileSize" information to assure the reception memory of the input image information and "fileType" information to render the input image data.

If the print specification indicates a frame print mode, the flow advances to step S123 to acquire folder information which stores the image in addition to "fileSize" information and "fileType" information so as to specify Info and Target images. After execution of step S123 or S124, the flow advances to step S125 to check if acquisition of image information is executed for all images specified by the print job. If acquisition of image information is not executed for all images, the flow returns to step S122; otherwise, the flow advances to step S126 to acquire required image data. The flow then advances to step S127 to apply image processes (rendering, enlargement/reduction process, color process, quantization process, layout process, and the like) to the acquired image data so as to generate print data, thus executing a print process based on the print data.

As described above, in the DSC 3012, it is arbitrarily determined whether or not the lower 4-digit minor code of the 8-digit layout code (904 in FIG. 9B) is interpreted. Hence, upon exchanging capability data using the <layouts> tag, control may be made by strictly interpreting the minor code sent from the PD printer 1000, but the minor code need not always be interpreted. That is, in a case where a frame print process is to be done, a print job may be generated to have a frame print specification as a default, and may be sent to the PD printer 1000 irrespective of whether or not the PD printer 1000 supports the frame print function.

Upon reception of this print job, if the PD printer 1000 supports the frame print function of the layout print function, it executes a frame print process requested from the DSC 3012. Even if the DSC 3012 outputs a print job that designates a frame print process, if the PD printer 1000 does not support the frame print function, i.e., if the PD printer 1000 ignores or cannot recognize the lower 4-digit minor code, it executes a normal layout print process, thus achieving an object.

FIG. 13 depicts a print example obtained when the DSC 3012 and PD printer 1000 in the first embodiment can interpret the minor code.

In this example, when two original images 1300 are designated, and a <layout> code "57020000" (orthodox layout which merely prints two laid out images) is sent, an image of a character string "Just married" and "photograph of bride" are printed on a single sheet side by side (1301).

When two original images 1300 are designated, and a <layout> code "57020001" (frame print) is sent, an image of a character string "Just married" is printed on the entire surface of the background of a sheet as an Info image. Furthermore, "photograph of bride" is reduced to a size smaller than the Info image, and undergoes an overwrite print as a Target image on the Info image. In this way, two images are printed as a single photograph on a single sheet (1302).

Even if the <layout> code "57020001" is sent from the DSC 3012 to the PD printer 1000, if the PD printer 1000 does not support this frame print function, an image of a character string and "photograph of bride" are printed side by side on a single-sheet in the same format as that obtained when the code "57020000" is sent (1301).

In this way, when the <layout> code "57020001" is sent to the PD printer 1000, which does not support the frame print function, so as to designate a frame print process, a conventional printer prints one or both of an image of a character string "Just married" and a photograph image of "bride" on different sheets as independent images, or does not print since it cannot interpret a layout. However, the first embodiment is very effective since an image of a character string "Just married" and a photograph image of "bride", i.e., associated information and an associated image, are printed at least side by side on a single sheet, as shown as 1301.

FIG. 14 is a flowchart for explaining a layout or frame print process in the PD printer 1000 according to the first embodiment. A program that implements this process is stored in the program memory 3003*a*, and is executed under the control of the CPU 3002 to execute the process shown in this flowchart.

This process is executed after a communication is established between the printer 1000 and DSC 3012, as has also been explained in the flowchart of FIG. 12. In step S141, a print job is received from the DSC 3012. The flow advances to step S142 to interpret the major code of the code included in this print job. This major code can be interpreted by any printer independently of its model as long as the printer can establish this communication procedure. The flow advances to step S143 to check if the major code designates a layout print process. If the major code does not designate a layout print process, the flow advances to step S144 to execute a process corresponding to the code.

If it is determined in step S143 that the major code designates a layout print process, the flow advances to step S145 to check if the minor code included in the code can be interpreted. If the minor code cannot be interpreted, the flow advances to step S146 to execute a normal layout print process. On the other hand, if it is determined in step S145 that the minor code can be interpreted, the flow advances to step S147 to check if that minor code designates the aforementioned frame print process. If the minor code does not designate the frame print process, the flow advances to step S148 to execute a process designated by that minor code.

On the other hand, if the minor code designates the frame print process, the flow advances to step S149 to specify an Info image that serves as a background image. The Info image may be specified by sending an inquiry about a folder name that stores an image to the DSC 3012, as described above, or by an image type (fileType). After the Info image is specified at step S149, the flow advances to step S150 to execute a variable magnification process (enlargement/reduction) of the Info image to the sheet size to be printed. The flow advances to step S151 to acquire a Target image to be printed on the Info image, and render it to a bit image. The flow advances to step S152 to composite the Info image that has undergone the variable magnification process to the sheet size in step S150, and the Target image rendered in step S151. Note that this composition process may be attained by simply adding these images or may include an image effect that allows a background image to be seen through by giving transparency. The flow advances to step S153 to print the generated frame image by the printer engine 3004.

As described above, according to the first embodiment, an optimal layout print process according to the printer specification or a frame print process as an extended function of the layout print process can be done without any complicated, troublesome capability exchange process, and without forcing a camera to have capability of generating a plurality of different print jobs according to the printer specifications.

Second Embodiment

The second embodiment of the present invention will be described below. In the second embodiment, a printer determines based on a received print job whether or not a frame print process is to be executed by checking if various conditions, which are set in advance between a camera and the printer, are satisfied; without preparing for any special command used to designate a frame print process from the camera to the printer.

Figure 15:
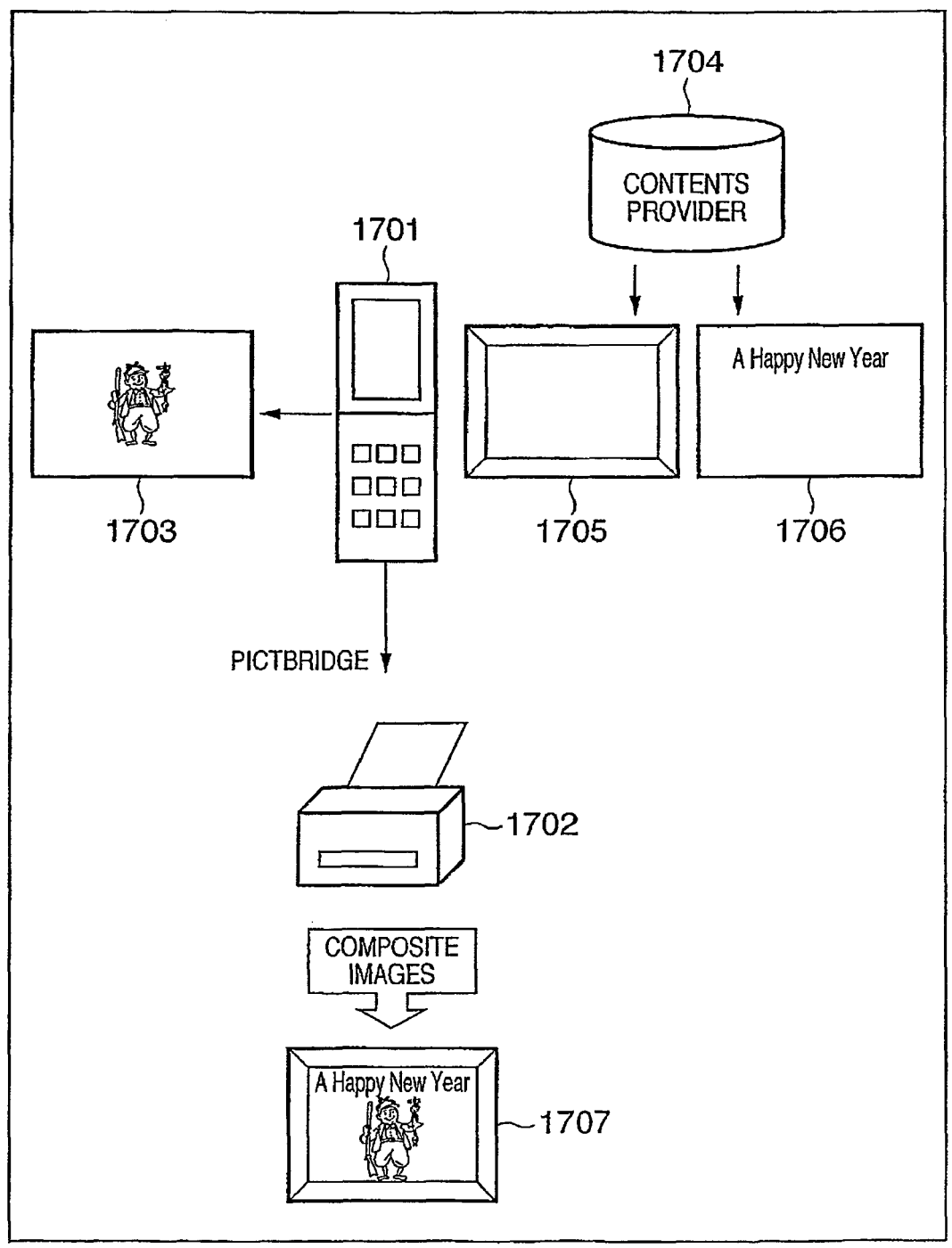
FIG. 15 depicts a view for explaining the arrangement and processing system according to the second embodiment of the present invention.

FIG. 15 depicts a view for explaining the arrangement and processing system according to the second embodiment of the present invention.

Referring to FIG. 15, reference numeral 1701 denotes a portable (cellular) phone with a camera function (to be referred to as a camera phone hereinafter), which plays the same role as the DSC 3012 in the first embodiment. A printer 1702 can realize the same functions and role as those of the PD printer 1000 according to the first embodiment. The second embodiment comprises the camera phone 1701, printer 1702, and connection means (not shown) which connects them. Note that this connection means includes the cable 5000 in the first embodiment or a wireless connection pattern.

Reference numeral 1703 denotes a photograph image photographed by the camera phone 1701. Reference numeral 1704 denotes a contents provider. The camera phone 1701 can acquire a plurality of pieces of frame information 1705 and 1706 to be overlaid on the photograph image 1703 from the contents provider 1704 via known distribution means such as the Internet or the like. The camera phone 1701 need not always acquire these pieces of frame information 1705 and 1706 from the contents provider 1704, and these pieces of frame information 1705 and 1706 may be built-in frames which are pre-stored in the main body of the camera phone 1701. Reference numeral 1707 denotes a print example by the printer 1702. The print example is obtained by transferring the photograph image 1703 and the two pieces of frame information 1705 and 1706 from the camera phone 1701 to the printer 1702, and compositing and printing them by the printer 1702. That is, in this composite print image 1707, the photograph image 1703 is laid out on the frame information 1705 as a background image, and the frame information 1706 as a character image is further overlaid on the image 1703 and printed.

The second embodiment will explain, as image examples to be composited and printed by the printer 1702, a case wherein one photograph image and one or a plurality of frame images are composited and the composite image is printed on a single sheet in a borderless mode, and a case wherein 16 photograph images are composited with one or a plurality of frame images and the composite image is printed in a border mode on a single sheet. Note that the present invention is not limited to such specific examples, and various other combinations of functions are available.

Figure 16:
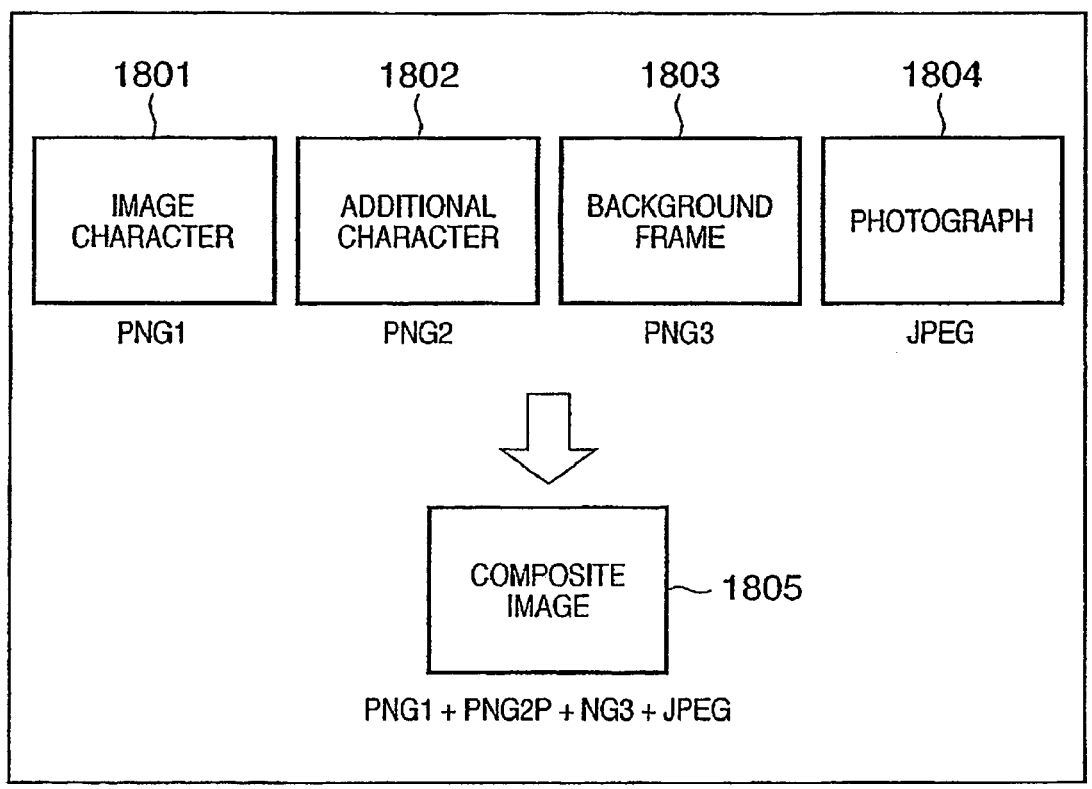
FIG. 16 depicts a view for explaining an example of image composition (1-up print) according to the second embodiment.

FIG. 16 depicts a view for explaining an example of image composition (1-up print) according to the second embodiment.

Reference numerals 1801 to 1803 denote a plurality of pieces of frame information to be overlaid on one photograph image 1804. The frame information 1801 includes an image character such as an icon character. The frame information 1802 indicates a character to be added, and the frame information 1803 indicates a background image. Note that the image format of each frame image is PNG, and that of the photograph image 1804 is JPEG. Reference numeral 1805 denotes a composite image obtained by compositing and printing the plurality of pieces of frame information 1801 to 1803 with the photograph image 1804. Since the composite image 1805 need only be printed as a photograph, it need not be stored as an image file in a storage medium or the like in the printer 1702. PNG is an image format that can designate transparency, and overlay of the frame information of this PNG image format, another frame information, and a photograph of the JPEG image format uses a known a blend scheme.

Note that the plurality of pieces of frame information 1801 to 1803 and the photograph image 1804 are laid out on the front side in turn from the left in FIG. 16 when they are composited. That is, the frame information 1801 of an image character is laid out on the frontmost side without being lacked to have top priority, and the frame information 1802 and the frame information 1803 as a background frame are laid out in the order of 1802 and 1803 below the frame information 1801. Within the background frame 1803, the photograph image 1804 is laid out. An example of the frame information 1801 is an image whose original purpose is unlikely to be achieved if it is partially lost. An example of the frame information 1802 is an additional character such as an animal drawn on the background frame. The frame information 1803 serves as a background of these pieces of frame information 1801 and 1802, and the image 1804 on which another frame information is overlaid and rendered like the frame 1707 in FIG. 15 and whose original purpose is not much hampered if it is partially lost.

Figure 17:
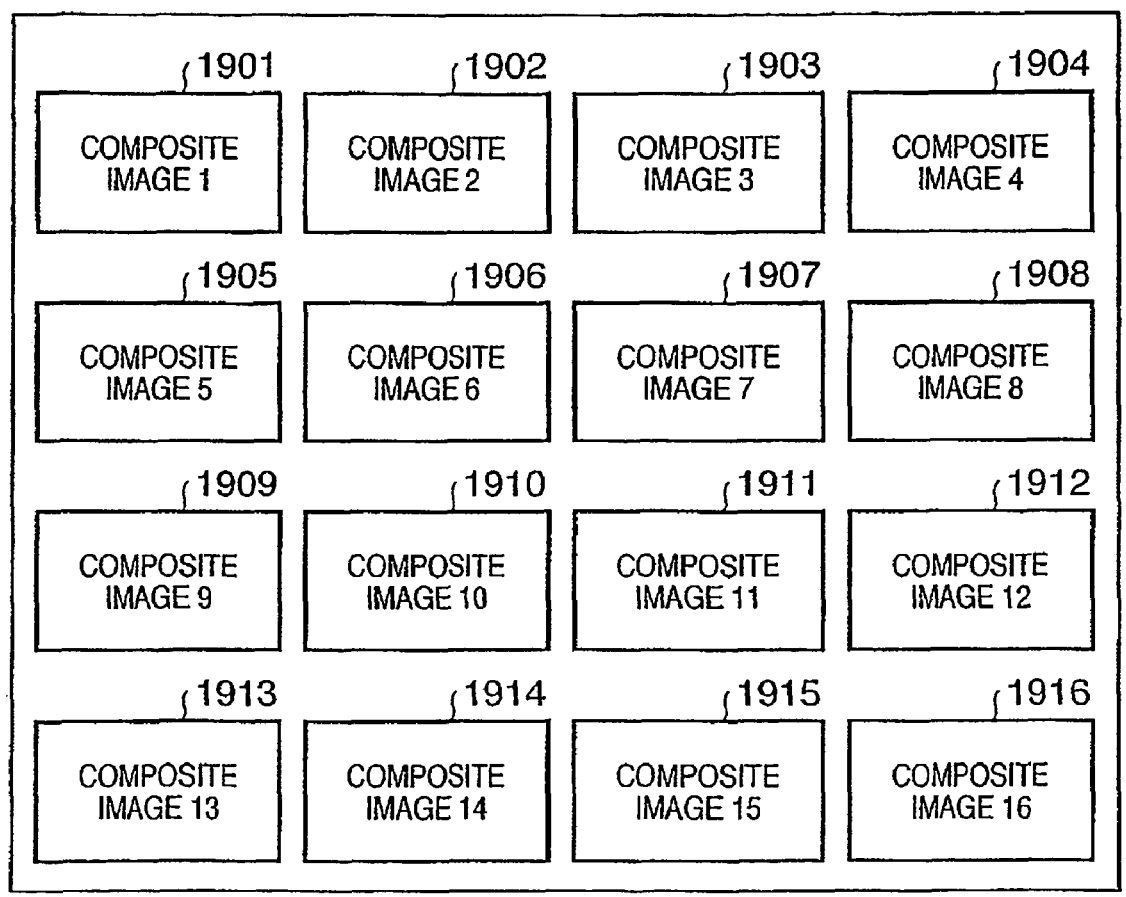
FIG. 17 depicts a view for explaining another image composition example (that prints 16 photographs on a single sheet) according to the second embodiment.

FIG. 17 shows another image composition example (that prints 16 photographs on one sheet) according to the second embodiment.

Sixteen composite images 1 to 16 (1901 to 1916) are printed in a border mode on one sheet 1900. Each composite image is formed by compositing one or a plurality of pieces of frame information and one photograph image, as described above. Each composite image is generated by compositing the frame information and photograph image in the same manner as in FIG. 16.

FIG. 18 depicts a view for explaining the types of data chunks which form the PNG image format.

Reference numeral 2200 denotes a mandatory chunk group, the decoding functions of which are indispensable for the printer 1702 that decodes a PNG image, and which include chunks 2201 to 2204 as elements. Reference numeral 2210 denotes an option chunk group, the decoding functions of which are not indispensable for the printer 1702 that decodes a PNG image in terms of the specification of the PNG image format, and which include chunks 2211 to 2220 as elements.

Upon executing the frame print process according to the second embodiment, a background color definition chunk "bKGB" 2211 and transparent color setting chunk "tRNS" 2212 of the option chunks 2210 are required in addition to the mandatory chunks 2200, and the printer 1702 has the decoding functions of a total of six chunks 2201 to 2204, 2211, and 2212.

FIG. 19 is a chart for explaining the flow of frame print instructions between an image input device 2101 and image output device 2102 according to the second embodiment.

Referring to FIG. 19, the image input device 2101 is an image input device, which supports a function that can designate a frame print process (corresponding to the DSC 3012 or the camera phone 1701). The image output device 2102 is an image output device, which supports a frame print function (corresponding to the PD printer 1000 or the printer 1702). The second embodiment will explain an example that implements the frame print process without extending an existing print service (e.g., PictBridge) that does not specify any frame print function. To this end, the frame print function of the image output device 2102 that supports the frame print function executes a frame print process with respect to a frame print instruction that satisfies at least the following prescribed conditions. The image input device 2101 that supports the frame print instruction function must issue a frame print instruction that satisfies the following prescribed conditions.

The image format of a photograph image is JPEG.
The format of frame information is PNG.
The number of frames that can be composited is 3.
The frame print process is executed in case of combined print designation in an order of PNG→JPEG. This order is that of image file IDs included in "DPS_StartJob".

In the second embodiment, the image output device 2102 supports a function of printing one image on a single sheet in a borderless mode (1-up borderless), as shown in FIG. 16, and a function of printing 16 composite images on a single sheet (16-up), as shown in FIG. 17.

Between the image input device 2101 and image output device 2102, connection, configuration, issuance of "ConfigurePrintService" by the image input device 2101, and issuance of "NotifyDeviceStatus(Idle)" (601: see FIG. 6) by the image output device 2102 are complete. However, at this time, these two devices do not recognize each other whether or not partner devices support the frame print function.

In step S2101, the image input device 2101 issues "DPS_GetCapability" to the image output device 2102 to inquire the functions supported by the image output device 2102. In this case, "fileTypes" is designated as Capability information. That is, in this case, the types of image files supported by the image output device 2102 are inquired. A practical example of this "DPS_GetCapability" is as follows:

```
<input>
  <getCapability>
    <capability>
      <fileTypes/>
    </capability>
  </getCapability>
</input>
```

In step S2102, the image output device 2102 returns Capability information (fileTypes) supported by itself in response to the above inquiry. Since the image output device 2102 supports the JPEG image format and PNG image format, Capability information (fileTypes) returned in step S2102 includes codes corresponding to JPEG and PNG. A practical example of the Capability information (fileTypes) in this case is as follows:

```
<output>
  <result>10000000</result>
  <getCapability>
    <capability>
      <fileTypes>53000000 53010000 530C0000</fileTypes>
    </capability>
  </getCapability>
</output>
```

Upon reception of this information, the image input device 2101 checks the Capability information (fileTypes) returned from the image output device 2102 to be connected, and confirms if a code "53010000" corresponding to the JPEG and a code "530C0000" corresponding to the PNG are included. If the code "53010000" or "530C0000" is included at this time, since the prescribed conditions are satisfied, the image input device 2101 determines that the image output device 2102 as a partner device supports the frame print function. Conversely, when neither of the codes "53010000" nor "530C0000" are included, since the prescribed conditions are not satisfied, the image input device 2101 determines that the image output device 2102 as a partner device does not support any frame print function, and does not issue any frame print instruction to that image output device 2102.

Therefore, processes in step S2103 and subsequent steps are executed when the image input device 2101 determines that the image output device 2102 as a partner device supports the frame print function. The image input device 2101 issues "DPS_GetCapability" again in step S2103 to inquire the functions of the image output device 2102 associated with layouts (layouts). A practical example of DPS_GetCapability in this case is as follows.

```
<input>
  <getCapability>
    <capability>
      <layouts/>
    </capability>
  </getCapability>
</input>
```

In step S2104, the image output device 2102 returns Capability information (layouts) of layouts supported by itself in response to the inquiry about the functions associated with (layouts). In this case, when the image output device 2102 supports, e.g., 1-up borderless (borderless print of one photograph per page) as layout function Capability information (layouts), it returns information including a corresponding code "57FF0000". When the image output device 2102 supports a function corresponding to 16-up, it returns information including a corresponding code "57100000" and a code "57000000" that means "printer implementation dependent (default setup in the printer)". A practical example of the Capability information (layouts) in this case is as follows:

```
<output>
  <result>10000000</result>
  <getCapability>
    <capability>
      <layouts>57000000 57100000 57FF0000</layouts>
    </capability>
  </getCapability>
</output>
```

With the above sequence, the image input device 2101 can acquire the Capability information (fileTypes) and Capability information (layouts) of the image output device 2102. Please refer to FIG. 9 above for layout information.

In step S2105, the image input device 2101 sets a JPEG photograph image to be used, a PNG frame image to be used, and the like in accordance with user's operations, and issues "DPS_StartJob" that describes the setup contents to the image output device 2102. A practical example of "DPS_StartJob" corresponding to the aforementioned example of FIG. 16 is as follows.

```
<startJob>
    <jobConfig>
        <fileType>52000000</fileType>
        <layout>57FF0000</layout>
    </jobConfig>
    <printInfo>
        <fileID>00000001</fileID>
    </printInfo>
    <printInfo>
        <fileID>00000002</fileID>
    </printInfo>
    <printInfo>
        <fileID>00000003</fileID>
    </printInfo>
    <printInfo>
        <fileID>00000004</fileID>
    </printInfo>
</startJob>
```

In this case, a code "52000000" that means "a plurality of mixed image formats" is set in <fileType>. This is to designate a composite output of images of two different image formats, i.e., the JPEG and the PNG. Also, a code "57FF0000" corresponding to "1-up borderless" is set in <layout>. Also, four file IDs "00000001", "00000002", "00000003", and "00000004" are designated in <fileID>. These file IDs respectively correspond to the plurality of pieces of frame information 1801, 1802, and 1803, and the photograph image 1804 in FIG. 16.

The image output device 2102 confirms <fileType> included in "DPS_StartJob" to see if the code "52000000" that means "a plurality of mixed image formats" is included. If the code "52000000" is designated in <fileType> at this time, since the received "DPS_StartJob" satisfies the prescribed conditions of the frame print instruction, the image output device 2102 requests file information associated with each of files designated in <fileID> in "DPS_StartJob" using "DPS_GetFileInfo" in step S2106.

On the other hand, if the code "52000000" is not designated in <fileType>, since the received "DPS_StartJob" does not satisfy the prescribed conditions, the image output device 2102 determines that the received instruction is not a frame print instruction, and prints, as a normal print instruction, the plurality of pieces of file information designated in <fileID> as independent images without overlaying them.

A practical command example used when the image output device 2102 requests file information associated with each of files designated by <fileID> in "DPS_StartJob" in step S2106 above is as follows. In this case, file information of the file number "00000001" designated by <fileID> is requested.

```
<input>
    <getFileInfo>
        <fileID>00000001</fileID>
    </getFileInfo>
</input>
```

In step S2107, the image input device 2101 returns file information associated with a file requested by "DPS_GetFileInfo". A practical return example of file information with the file number "00000001" is as follows.

```
<output>
    <result>10000000</result>
    <getFileInfo>
        <fileType>530C0000</fileType>
        <fileSize>000ABCDE</fileSize>
    </getFileInfo>
</output>
```

This indicates that the file information with the file number "00000001" has the PNG code and a file size "000ABCDE" (hexadecimal).

By repeating steps S2106 and S2107 in correspondence with the number of <fileID> fields designated by "DPS_StartJob" in step S2105, the image output device 2102 can acquire file information of all the files designated by "DPS_StartJob" from the image input device 2101. Upon completion of acquisition of all the pieces of file information designated by "DPS_StartJob", the image output device 2102 actually confirms <fileType> of respective files to determine if "DPS_StartJob" in step S2105 is a frame print instruction. In the current example, the prescribed conditions are satisfied since:

The file with the file number "00000004" is the JPEG file.
The files with the file numbers "00000001", "00000002", and "00000003" are the PNG files.
The number of the PNG files is 3.
Combined print designation of the PNG (three files)→the JPEG (one file) is made (<fileType> is "52000000").

Hence, the image output device 2102 processes "DPS_StartJob" received in step S2105 as a "1-up borderless"-designated frame print instruction. If the file type or the number of files does not meet the prescribed conditions, the image output device 2102 determines that this "DPS_StartJob" is not a frame print instruction, and prints, as a normal print instruction, files designated by <fileID> as independent images without overlaying them.

As described above, the frame print function of the image output device 2102 that supports the frame print function is executed at least when the prescribed conditions are satisfied, and the image input device 2101 that supports the frame print instruction function must issue a frame print instruction that satisfies these conditions. In this way, the image input device 2101 can recognize if the image output device 2102 has the frame print function by acquiring Capability information of the image output device 2102. Conversely, the image output device 2102 can determine if an input instruction is a frame print instruction, by acquiring and interpreting the contents of "DPS_StartJob" issued by the image input device 2101, and file information of files designated by the command. Hence, even in an existing print service that does not specify any frame print function, a frame print function can be implemented without extending the service, and it can be determined by each others devices whether or not the function is supported.

Figure 20:
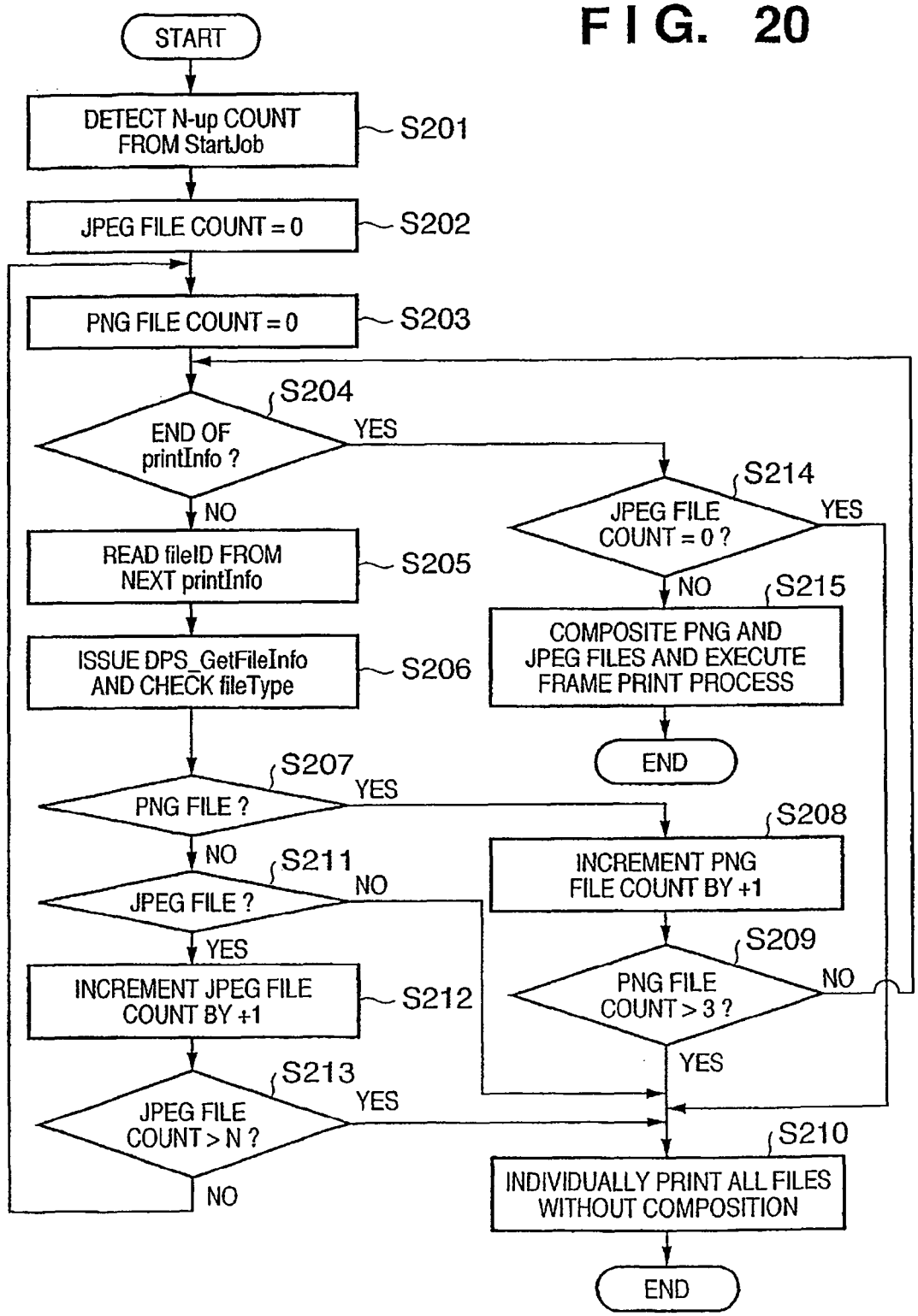
FIG. 20 is a flowchart showing a determination process as to whether or not "DPS_StartJob" includes a frame print instruction in the image output device (PD printer) according to the second embodiment.

FIG. 20 is a flowchart showing a determination process for determining if "DPS_StartJob" includes a frame print instruction, in the image output device 2102 (PD printer) according to the second embodiment. In FIG. 19, an explanation specialized to the case of "1-up borderless" has been given. However, FIG. 20 will explain a case wherein determination is made based on the following additional conditions in addition to the prescribed conditions so as to be able to support 16-up designation shown in FIG. 16, and other cases. In addition to the above conditions:

A frame print function can be designated in an N-up print process of two or more images.

the PNG and the JPEG files can be independently designated for two or more images.

The number of print sheet of "DPS_StartJob" that designates a frame print process is one.

Files other than the PNG and JPEG files are not designated in "DPS_StartJob" that designates a frame print process. The process shown in the flowchart of FIG. 20 corresponds to details of a loop of steps S2106 and S2107 in FIG. 19, which starts when the image output device 2102 receives "DPS_StartJob" in step S2105 in FIG. 19.

In step S201, information "N-up count" indicating the number of photograph images per one page is acquired based on <layout? in "DPS_StartJob". A JPEG file count is reset to "0" in step S202, and a PNG file count is also reset to "0" in step S203. After that, the flow advances to step S204. It is checked in step S204 if all printInfo fields included in "DPS_StartJob" have been interpreted. If printInfo fields to be interpreted still remain, the flow advances to step S205 to acquire a file number designated in <fileID> in printInfo to be interpreted. In step S206, "DPS_GetFileInfo" is issued based on the file number acquired in step S205, and <fileType> returned from the image input device 2101 in response to the request is checked.

It is determined in step S207 whether <fileType> in the reply to "DPS_GetFileInfo" indicates the PNG file. If <fileType> does not indicate the PNG file, the flow advances to step S211; otherwise, the flow advances to step S208. In step S208, the PNG file count is incremented by 1 so as to confirm the number of frames to be overlaid on a JPEG image to be designated later. It is determined in step S209 whether the PNG file count value has exceeded "3". If the PNG file count value has exceeded "3", since the prescribed conditions are not satisfied, the flow advances to step S210, and it is determined that all files are to be independently printed without composition, thus ending this checking process. On the other hand, if it is determined in step S209 that the PNG file count value has not exceeded "3", the flow returns to step S204 to repeat the aforementioned process.

On the other hand, if it is determined in step S207 that <fileType> does not indicate the PNG file, the flow advances to step S211 to check if <fileType> in the reply to "DPS_GetFileInfo" indicates the JPEG file. If <fileType> does not indicate the JPEG file, since a file other than JPEG/PNG is designated and the fourth additional condition is not met, the flow advances to step S210, and it is determined that all files are to be independently printed without composition, thus ending this checking process.

If it is determined in step S211 that <fileType> indicates the JPEG file, the flow advances to step S212 to increment the JPEG file count value by 1 so as to confirm the number of JPEG images to be printed per one page. It is checked in step S213 if the JPEG file count value has exceeded the value N of N-up. If the JPEG file count value has exceeded the value N, since a print process across a plurality of pages must be done and the third additional condition is not met, the flow advances to step S210, and it is determined that all files are to be independently printed without composition, thus ending this checking process. On the other hand, if it is determined in step S213 that the JPEG file count value has not exceeded the value N, the flow returns to step S203 to repeat the aforementioned process.

If it is determined in step S204 that interpretation of printInfo is complete, the flow advances to step S214 to check the JPEG file count value so as to confirm the number of JPEG files confirmed so far. If the JPEG file count value is "0", since no JPEG file is included and the aforementioned prescribed conditions are not satisfied, the flow advances to step S210, and it is determined that all files are to be independently printed without composition, thus ending this checking process. If the JPEG file count value is other than "0", the flow advances to step S215 to execute a frame print process by compositing the PNG and JPEG files.

Figure 21:
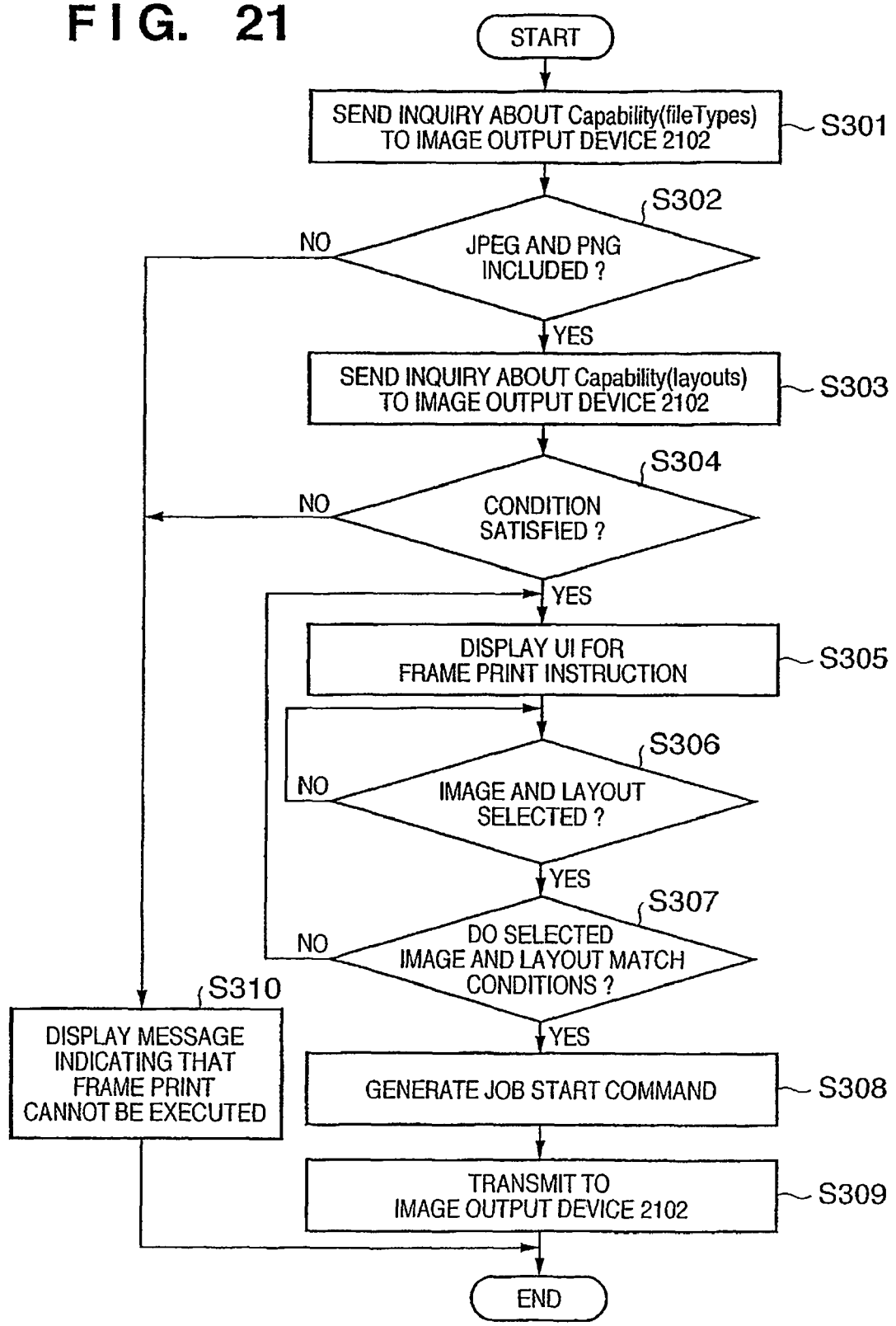
FIG. 21 is a flowchart showing a frame print instruction process in the image input device (camera) according to the second embodiment.

FIG. 21 is a flowchart for explaining the process by the image input device 2101 according to the second embodiment of the present invention, and a program that implements this process is stored in the ROM 3101 in case of, e.g., the aforementioned DSC 3012.

This process starts when a frame print instruction is input at the image input device 2101. In step S301, an inquiry about Capability(fileTypes) is sent to the image output device 2102 to acquire file information that can be processed by the image output device 2102. Upon reception of a response to this inquiry, it is determined in step S302 whether the image output device 2102 can process a plurality of different formats, i.e., it can process the JPEG and PNG files in this case. If the image output device 2102 can process a plurality of different formats, the flow advances to step S303; otherwise, the flow jumps to step S310 to display a message indicating that the frame print process cannot be executed on the display unit 2700, thus ending this process. An inquiry about layout functions supported by the image output device 2102 is sent to the image output device 2102 using Capability(layouts) in step S303. It is determined in step S304 based on a response from the image output device 2102 whether the image output device 2102 has layout functions which match the frame print conditions. If the image output device 2102 has layout functions which match the frame print conditions, the flow advances to step S305; otherwise, the flow jumps to step S310 to end this process.

Since it is determined that the frame print process can be done using the image output device 2102, a UI window used to instruct a frame print process is displayed on the display unit 2700 in step S305. In this way, the user selects a plurality of images which are to undergo the frame print process and a layout (1-up, N-up, etc.) of these selected images with reference to the UI window in step S306. Note that the user may designate the overlay order (priority order) of images in the frame print process. Upon completion of image selection and layout designation in step S306, the flow advances to step S307 to check if the designated images and setup conditions meet the aforementioned frame print instruction conditions. That is, the conditions include that only JPEG and PNG files are designated, the number of the PNG files is a predetermined value, the number of sheets to be printed is 1, 1-up or N-up is designated, and so forth. If these conditions are not satisfied, the flow returns to step S305, and a message indicating that the conditions are not satisfied is displayed on the display unit 2700, thus prompting the user to select images and designate print conditions again.

If it is determined in step S307 that the input conditions are satisfied, the flow advances to step S308 to generate a print job start command (DPS_StartJob). In step S309, the print job start command is sent to the image output device 2102.

Note that the image output device 2102 is a printer in the description of this flowchart. However, for example, when the image output device 2102 is a display device, this flowchart can be similarly executed. In this case, for example, the image 1707 in FIG. 15 is displayed on the screen of that display device.

As described above, according to the second embodiment, detailed conditions associated with the file designation method in "DPS_StartJob" are set, and the image output device 2102 operates to execute a frame print process only when these conditions are met. Hence, the risk that a normal print instruction sent from the image input device 2101, which does not support a frame print function, is erroneously determined as a frame print instruction, and the probability of getting a print result that fails to meet user's expectation is obtained can be reduced.

Note that all files are independently printed without composition in step S210. The present invention is not limited to this. In some cases, only files which match the conditions may undergo frame composition, and files which do not match the conditions may be independently printed.

In the second embodiment, "fileType" in "fileInfo" acquired by "DPS_GetFileInfo" is used as the conditions that specify the frame print function. The present invention is not limited to this. For example, the frame print process may be done when a setup "other than full opacity" is found in a transparency color setup chunk "tRNS" 2212 in the PNG file acquired by "DPS_GetFile", a setup "other than full opacity" is found in an α value in the image data, or a specific character-string ("e.g.,: "FRAME") is found in a text data chunk "tEXT" 2219, or the like.

In the second embodiment, a composite image is formed when <fileType> has a setup PNG→PNG→PNG→JPEG. Conversely, JPEG may be set first like JPEG→PNG→PNG→PNG.

In addition, GIF files and the like may be used as frame images.

In the second embodiment, only designations of <fileType> and <fileID> are used as the prescribed conditions, but other items such as <paperSize> and the like may be used as conditions. Especially, as for <paperSize>, the resources such as the RAM and the like of the image output device 2102 are consumed as a paper size becomes larger, and the processing load on the frame print process becomes heavier. Hence, it is very effective to limit the frame print function to a specific maximum size, or to specify the number of the PNG files that can be overlaid for each paper size (e.g., three files up to a postcard size, two files up to A4, one file for a size larger than A4, and the like). Furthermore, it is effective to set the upper limit value of the number of images that can be laid out (e.g., up to 16-up) in the frame print process.

As described above, it is effective to set the condition independently of capability data of an existing print service, and to share that condition by the image input device 2101 and image output device 2102 in advance.

In the second embodiment, for example, when 16-up is designated and three PNG files are composited to each JPEG image, the number of <printInfo> fields included in "DPS_StartJob" issued by the image input device 2101 is 64 (=16+48). However, in practice, the image output device 2102 interprets, as a frame print instruction per page, "DPS_StartJob" that includes 16 photographs (JPEG) and 48 pieces of ornament information (PNG) since each PNG file is considered as ornament information of a JPEG file. Using this, the image input device 2101 can confirm if the image output device 2102 supports a frame print function. That is, the image input device 2101 issues a frame print instruction "DPS_StartJob" including 64 <printInfo> fields. In response to this instruction, if the image output device 2102 supports a frame print function, <progress> indicating print progress should become "001/001" (the total number of sheets is one, and the print process of the first sheet is in progress). However, if the image output device 2102 does not support a frame print function, <progress> indicating print progress becomes "001/004" (the total number of sheets is four, and the print process of the first sheet is in progress). Hence, the image input device 2101 that receives such response can easily determine based on the response if the image output device 2102 supports the frame print function.

The reason why "DPS_StartJob" does not exceed one page as the additional condition is to uniquely determine the contents of <progress> in the frame print process, and to allow easy determination. For the same purpose, other conditions such as the total number of <printInfo> fields, and the like may be specified.

Therefore, the image input device 2101 confirms the contents of <progress> after it issues "DPS_StartJob". If the image input device 2101 inadvertently issues a frame print instruction "DPS_StartJob" to the image output device 2102 that does not support the frame print function, it can quickly prevent the image output device 2102 from executing a print process that the user does not want by "DPS_AbortJob", the end of a print service, or other means.

As described above, according to the second embodiment, since the image output device 2102 does not count the number of pieces of frame information as the number of photographs in a frame print instruction, the image input device 2101 can easily determine using print progress information from the image output device 2102 whether or not the image output device 2102 supports the frame print function.

Other Embodiments

The objects of the present invention can also be achieved by supplying a storage medium, which records a program code of a software program to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. As the storage medium for supplying the program code, for example, a Floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priorities from Japanese Patent Application No. 2003-290600 filed on Aug. 8, 2003 and Japanese Patent Application No. 2004-093159 filed on Mar. 26, 2004, which are hereby incorporated by reference herein.

The invention claimed is:

1. A print control apparatus for causing a printing unit to print an image on a printing sheet based on image data supplied from an image supply device, the apparatus comprising:
    a reception unit that receives a job from the image supply device, wherein the job describes a maximum number of layout images that are laid out on a sheet and information for specifying image data to be printed;
    a job analysis unit that analyzes the job received from the image supply device to determine a number of images of JPEG format and a number of images to be overlaid on an image of JPEG format designated in the job; and
    a control unit that (i) controls the printing unit to print the image data to be printed by overlaying the image data when (a) the number of images of JPEG format is less than the maximum number of the layout images and (b) the number of images to be overlaid on the image of JPEG format is less than a predetermined number, and (ii) controls the printing unit to print the image data to be printed without overlaying the image data when (a) the number of images of JPEG format is not less than the maximum number of the layout images or (b) the number of images to be overlaid on the image of JPEG format is not less than the predetermined number.

2. An apparatus according to claim 1, wherein the format of the number of images to be overlaid is a PNG format.

3. An apparatus according to claim 1, further comprising a setting unit that sets an overlaying order of images printed on a sheet in accordance with an order of images designated in the job.

4. A method of controlling a print control apparatus for causing a printing unit to print an image on a printing sheet based on image data supplied from an image supply device, the method comprising:
    receiving a job from the image supply device, wherein the job describes a maximum number of layout images that are laid out on a sheet and information for specifying image data to be printed;
    analyzing the job received from the image supply device to determine a number of images of JPEG format and a number of images to be overlaid on an image of JPEG format designated in the job;
    controlling the printing unit to print the image data to be printed by overlaying the image data when (a) the number of images of JPEG format is less than the maximum number of the layout images and (b) the number of images to be overlaid on an image of JPEG format is less than a predetermined number, and
    controlling the printing unit to print the image data to be printed without overlaying the image data when (a) the number of images of JPEG format is not less than the maximum number of the layout images or (b) the number of images to be overlaid on an image of JPEG format is not less than the predetermined number.

5. A method according to claim 4, wherein the format of the number of images is a PNG format.

6. A method according to claim 4, further comprising a step of setting an overlaying order of images printed on a sheet in accordance with an order of images designated in the job.

* * * * *